(12) United States Patent
Clifton-Bligh

(10) Patent No.: US 7,764,272 B1
(45) Date of Patent: Jul. 27, 2010

(54) METHODS AND DEVICES FOR SELECTING ITEMS SUCH AS DATA FILES

(75) Inventor: Gervase Clifton-Bligh, London (GB)

(73) Assignee: Fractal Edge Limited, Isle of Man (GB)

( * ) Notice: Subject to any disclaimer, the term of this patent is extended or adjusted under 35 U.S.C. 154(b) by 238 days.

(21) Appl. No.: 10/069,639

(22) PCT Filed: Aug. 29, 2000

(86) PCT No.: PCT/GB00/03320

§ 371 (c)(1),
(2), (4) Date: Jul. 8, 2002

(87) PCT Pub. No.: WO01/15011

PCT Pub. Date: Mar. 1, 2001

(30) Foreign Application Priority Data

Aug. 26, 1999 (WO) .................... PCT/GB99/02820
Nov. 5, 1999 (GB) ................................ 9926274.3

(51) Int. Cl.
*G06F 3/041* (2006.01)
(52) U.S. Cl. .................................... 345/173; 345/156
(58) Field of Classification Search .......... 345/156–184
See application file for complete search history.

(56) References Cited

U.S. PATENT DOCUMENTS 4,121,204 A * 10/1978 Welch et al. ................ 345/174

(Continued)

FOREIGN PATENT DOCUMENTS

EP 0 675 426 A1 10/1995

(Continued)

OTHER PUBLICATIONS

"Crashcourse in IMAGEMAPPING" http://www.webhelp.org/imagemap/index.html pp. 1-3 (May 4, 1999).

(Continued)

*Primary Examiner*—Srilakshmi K Kumar
(74) *Attorney, Agent, or Firm*—Fredrikson & Byron, PA

(57) ABSTRACT

A method is described for allowing a user to select one of a plurality of items. The user employs a device having a display area, and a joystick or a contact sensitive area. The device displays a number of regions equal to the number of items, and defines a number of sections in the angular range of the joystick, or sections within the contact sensitive area, equal to the number of items, and arranged corresponding to the arrangement of the regions of the display area. The user selects one of said items by selecting the corresponding section.

28 Claims, 13 Drawing Sheets

U.S. PATENT DOCUMENTS

| | | | | |
|---|---|---|---|---|
| 4,566,001 | A | | 1/1986 | Moore et al. ................ 340/711 |
| 4,736,191 | A | * | 4/1988 | Matzke et al. ................. 341/20 |
| 5,367,199 | A | | 11/1994 | Lefkowitz et al. ........... 307/116 |
| 5,404,152 | A | * | 4/1995 | Nagai ......................... 345/157 |
| 5,583,833 | A | | 12/1996 | Capps et al. ................ 368/185 |
| 5,729,219 | A | * | 3/1998 | Armstrong et al. ............ 341/20 |
| 5,777,603 | A | * | 7/1998 | Jaeger ........................ 345/172 |
| 5,805,145 | A | * | 9/1998 | Jaeger ........................ 345/172 |
| 5,903,229 | A | * | 5/1999 | Kishi .......................... 341/20 |
| 5,959,611 | A | * | 9/1999 | Smailagic et al. ........... 345/156 |
| 6,178,338 | B1 | * | 1/2001 | Yamagishi et al. .......... 455/566 |
| 6,670,952 | B2 | * | 12/2003 | Jaeger et al. ................ 345/179 |
| 2002/0145587 | A1 | * | 10/2002 | Watanabe .................. 345/156 |

FOREIGN PATENT DOCUMENTS

| | | |
|---|---|---|
| EP | 0 811 940 A2 | 12/1997 |
| EP | 0 860 765 A1 | 8/1998 |
| GB | 2 145 257 A | 3/1985 |
| GB | 2 332 293 A | 6/1999 |
| WO | WO 94/29788 | 12/1994 |
| WO | WO 98/33127 | 7/1998 |
| WO | WO 99/10820 | 3/1999 |

OTHER PUBLICATIONS

"Tree-Maps: A Space-Filling Approach to the Visualization of Hierarical Information Structures" (Brian Johnson, Ben Shneiderman)*Proceedings of the Annual Conference on Visualization*, Los Alamitos, Soc. Press, pp. 284-291, 1991.

"The Hyperbolic Browser: A Focus + Context Technique for Visualizing Large Hierarchies" (John Lamping and Ramona Rao) *Journal of Visual Languages and Computing* (Mar. 1996)vol. 7, No. 1, pp. 33-55.

"Cyclops A One Button Alpha-Numeric Keypad" (Brian Johnson and Gary Rapps) *Motorola Technical Developments* vol. 15 ( May 1, 1992) pp. 49-56.

"Rectilinear Pointing Device and Cursor Control" *IBM Technical Disclosure Bulletin* vol. 29, No. 10 pp. 4651-4652; (Mar. 1987).

"WWW Fisheye-View Graphical Browser",( Debora C. Muchaluat, Rogerio F. Rodrigues, Luiz Fernando G. Soares) *Laboratorio TeleMidia, Depto. De Informatica, PUC-Rio R. Marques de Sao Vicente* 225-22453-900-Rio de Janeiro, Brasil; pp. 80-89.

* cited by examiner

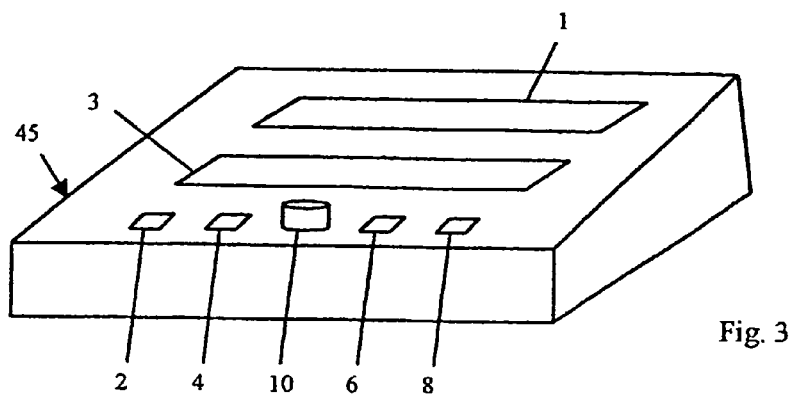
Fig. 3
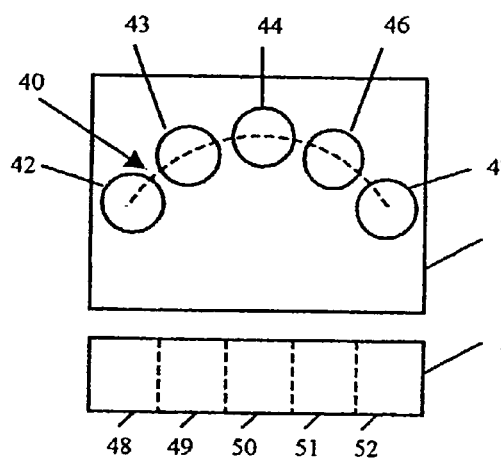
Fig. 4
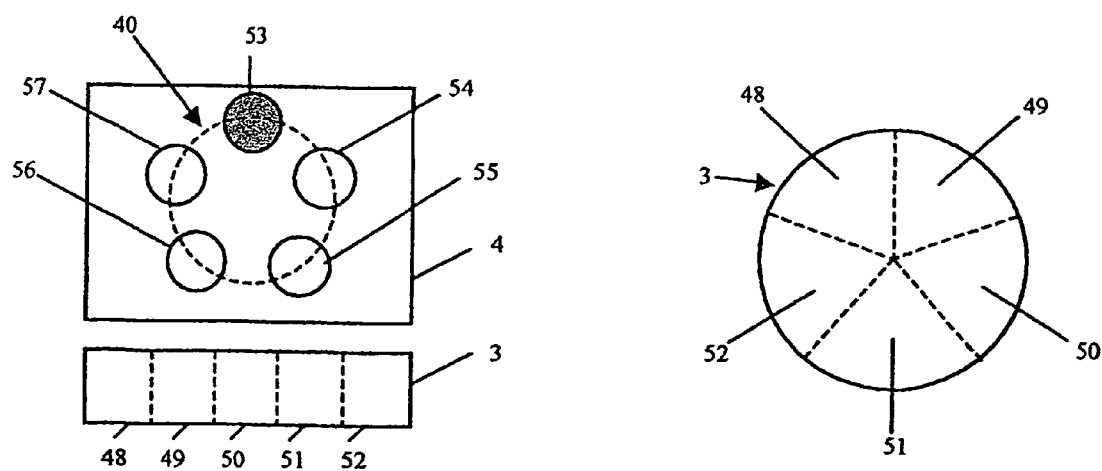
Fig. 5a                                Fig. 5b

METHODS AND DEVICES FOR SELECTING ITEMS SUCH AS DATA FILES

FIELD OF THE INVENTION

This invention relates to methods for selecting one of a plurality of items. In particular the items may be data files, and in this case the invention proposes a method for accessing information about data files (or portions of a data file). and for moving between data files (or within a data file), e.g. to open a data file. The invention further relates to a device for performing any of the methods, including a display. The invention further relates to a computer program product (such as a recording medium) which is readable by computer apparatus to cause the computer apparatus to perform a method according to the invention.

The files referred to throughout this document may be electronic files, but may alternatively be files stored on any other recording medium, for example an optical or holographic data storage medium. As discussed in detail below, the invention is particularly suitable, for example, for displaying relationships between data files which are part of the world wide web.

DISCUSSION OF THE PRIOR ART

The vast amount of information stored on the world wide web is divided into data files, each of which has an "address", and is stored on a computer called a "server". One kind of file is called a "page" and simply contains a set of information. The format of the information differs from one page to another, for example, some pages may contain just text, while others might for instance reference some audio or visual files to display at a certain point in the pages. Using a program called a "browser", a user of the web is able to display the pages in a part of his or her screen called a "browser array", for example one page at a time. Specifically, the user may be said to have a location within the web which corresponds to a page of the web, and to view the page which corresponds to his location.

Like the pages of a conventional book which are arranged in a numbered sequence, the pages of the world wide web have defined logical relationships to each other, but the logical relationships between the pages of the web are much more complicated than a simple numbered sequence. The purpose of these logical relationships is to connect pages which contain related information. For example, a page containing information on a first topic (say "patents") may be logically related to one or more other pages containing information on related topics (such as "patent attorneys").

The logical relationships between pages are defined by logical links known as "hyperlinks". The hyperlinks are conventionally defined in a "hypertext" programming language (or possibly a more sophisticated content presentation format such as a Flash or Lingo file), the type of language upon which the world wide web is based (the term hypertext is commonly used to include "hypertext mark-up language" (HTML), Dynamic HTML, Wireless Markup Language (WML), Active Server Pages, etc), and the term "hyperlink" is further used here to mean a link defined in an AWT such as JAVA's, or any other languages used for layout and interaction.

A single page may contain one or more "hyperlinks" each associated with a portion of the page (e.g. a few words of that page) known as an "anchor". The hyperlink defines a logical relationship between the "anchor" portion of the page and a second page of the world wide web (or possibly a particular place in that second page). A user can access that second page simply by positioning a cursor in the anchor portion of the display and clicking a button, such as a button of a mouse. This automatically replaces the page he is viewing with the second page connected to it by the hyperlink. Thus, the second pages are said to be "one click" from the first page, meaning that a user connected to the first page can access the second pages (i.e. display some or all of the information in the second page within his browser array) by a single clicking motion (not including clicks performed by the user on the scrollbar). The first page may contain any number of anchors, each associated with a respective portion of the first page, and each leading via a respective hyperlink to a respective second page.

Of course, a second page too may have anchors in it, each leading to a respective third page. The third pages are said to be "two clicks" from the first page, meaning that they can be accessed from the first page by two clicking motions, a first clicking motion which takes the user from the first page to the second page (i.e. changes the browser display to represent the second page, or represents that page in a second browser display), and a second clicking motion which moves the user from the second page to the third page. The hyperlinks thus provide a way of navigating through the myriad of pages available on the web in search of specific information, by moving between the pages logically related by hyperlinks. Since any page may contain many anchors, there can be many second pages related to each first page, and many third pages related to each second page. In fact, the number of pages n-clicks away from a given first page rises approximately exponentially with n.

A further complexity is provided by a type of file called a "frame set". Although pages of the world wide web may be unstructured, in the sense that they consist entirely of a list of stored information, a "frame set" does have a structure, and may be thought of as a file which partitions the browser array into a number of sections and displays another predetermined file in each of those sections, for example so that different sorts of information on a given topic are classified into different sections. Any number of anchors may be located in any of the files displayed in the sections. Supposing that a user uses a browser to access a first file which is a frame set, the browser display area is divided into a number of sections corresponding to the number of sections in the frame set and a particular file (e.g. a page) is loaded into each of the sections. When the user clicks on an anchor portion within one of the sections, that (or a different) section of the browser display area (or possibly the whole browser area or the whole of a new browser area) is replaced by a second file (e.g. a page) connected to the anchor portion by a hyperlink. However, the rest of the display area (i.e. the other sections of the frame set) remains displayed to the user.

The world wide web is in fact a single example of a networked computer file system based on a hypertext. Other examples of a hypertext based system include other global Internet systems not for some reason classified as being the world wide web (for example, because they are owned by a large company or government department and not publicly accessible), so-called "intranet" systems (generally, privately owned non-global internet systems), or indeed any other system using a hypertext language (such as HTML or Dynamic HTML) to define and permit movement between files. These systems are in turn examples of what may be called a "hyperspace", that is a set of data files, each having an address or name, the set of files having logical relationships defined between members of the set.

For example, a conventional directory structure is an example of a hyperspace. A directory structure consists of data files of two forms: (i) data files here called "branch nodes" which contain (usually only contain) logical links to other data files, and (ii) data files called "leaf nodes" which may contain information but do not contain links to other data files of the hyperspace. An empty directory is an example of a leaf node, as is a text file, a picture file, a video file or an audio file; and a directory which is not empty is an example of a branch node.

Such a logically related set of data files may be a pure hierarchy (tree structure). That is, one directory (the "root directory") is designated the uppermost level of the hierarchy. There is a maximum of one logical link to each directory (although the directory itself may contain any number of logical connections to other data files), and every data file (including all the directories) can be reached from the root directory by a single path, along a series of the logical connections defined above. The data files which can be reached by a single logical link from a given directory are said to be "in" the directory. Here, we will refer to a data file which can be reached from the top directory by following i logical links as being in the (i+1)-th level (the root directory is the first level).

In fact, a directory structure may not be a pure tree structure, because of "short-cuts" for example, or because some HTML files and hyperlinks are included within the definition of the hyperspace in question. Thus a directory structure may be an example of a logical relation between files which form a tree-like structure (which approximates a tree structure), in which for example over 90% of the logical connections conform to a tree structure.

In a conventional tool for navigating a hierarchy of data files (e.g. Microsoft Windows or Windows Explorer), a certain data file (e.g. leaf node) is reached along a path of logical connections from the root directory, e.g. along one or more intermediate directories, by the following procedure. Starting with the root directory (or from any other point), a symbol is drawn for each data file in the root directory. These symbols are drawn displayed in a column. The user clicks on the symbol representing the intermediate directory which is on the path to the data file he wishes to reach. Then the process is repeated, with that intermediate directory in the place of the top directory. To reach a data file in the (i+1)-th level requires i clicks. The last of these clicks is on a symbol representing the data file which the user wishes to reach.

During this process a user will only see a symbol representing a particular data file if that data file happens to be in one of the intermediate directories on the path. Therefore, it is essentially impossible for the user to gain an impression of the overall shape of the directory structure, for example whether the leaf nodes are uniformly distributed in the hierarchy. In other words, this navigation tool is not suitable for visualizing a directory structure.

Navigating (moving between) web files is a disorientating experience. For this reason there have been proposals to allow a graphical representation of the connections between the pages of a single web site. One such method is proposed in the paper "The Hyperbolic Browser: a focus and context technique for visualising large hierarchies", by John Lamping and Ramana Rao, Journal of Visual Languages and Computing, 1996, 7, 33-55. Another is proposed in U.S. Pat. No. 5,877, 766. Both representations rely on the pages within the site being connected in a tree-like structure, and thus they are not applicable to sites having more complex structures, and certainly not to representing the very complex network structure of a web such as the world wide web.

In International patent application PCT/GB99/02820, the present inventor proposed a mapping method (a "fractal space map") which is not necessarily limited to data files in a hierarchical structure. The present application claims priority from application PCT/GB99/02820 and the disclosure of application PCT/GB99/02820 which is omitted from this application is incorporated herein by reference. The mapping method is illustrated in FIG. 10, for example. Since it may be used in combination with the present invention, it is described in more detail below with reference to the present embodiments. According to the mapping method of PCT/GB99/02820, for a given first file (e.g. the current browser file) a first region 403 representing that file is displayed on a screen. Smaller second regions 411, 412, 413 are displayed, near or inside the first region, respectively representing four second files one click away from the first file. This display is generalised beyond second files to include files any number of clicks from the first file. At any level, the files logically related to a given file are represented by smaller regions near or within the region for that given file. Thus, the display has the "fractal" appearance illustrated on FIG. 10. The display may be used for navigation between the data files, e.g. permitting the user to open one of the data files by clicking on the corresponding region. Thus, any connection geometry can be represented. There is no limitation that the files should be part of the same site.

SUMMARY OF THE INVENTION

The present invention seeks to provide a new and useful way of selecting an item, such as a data file or a portion thereof.

It further preferably seeks to provide devices which allow the selection of an item in an intuitive and efficient manner, e.g. to allow a user to obtain information about a data file.

It further preferably seeks to provide a way of accessing various levels of limited data about files (e.g. titles) which allows the user to gain an impression of the significance of a given file before opening the file.

In its broadest terms the present invention proposes selecting one of a number of items using, in combination, a display (which displays a respective region for each item) and data input device within which a user can select within a continuous range. The input device is a contact-sensitive surface which registers the location of a contact, or a joystick device which can be urged in any of a continuous range of angles. The continuous range is (notionally) partitioned into sections, the number of sections being chosen to be equal to the number of regions, and the sections being relatively arranged corresponding to the relative arrangement of the regions. Thus, a user can select one of the items by contacting the respective section.

Specifically, a first expression of the invention is a method for allowing a user to select one of a plurality of items, the method employing a device having a display area and, separately from the display area, a data input means (either a touch-sensitive area or a joystick input device) which registers a selection made by a user within a continuous range (the location of a contact made by the user within the sensitive area, or the direction of urging of a joystick), the method including:

displaying within the display area a number of regions equal to the number of items;

defining within the continuous range a number of sections equal to the number of items, the arrangement of said sections corresponding to the arrangement of said regions of the display area, each section corresponding to a respective region, whereby the user can select one of said items by contacting a respective one of said sections.

A second expression of the invention is a device for allowing a user to select one of a plurality of items, the device having a display area, for displaying a number of regions equal to the number of items;

a data input means which registers a selection made by a user within a continuous range (the data input device is either a contact sensitive area, different from said display area, which registers the location of a contact made by the user within the area, or a joystick input device which registers the angle in which a joystick is urged); and a processor for (i) defining within the continuous range a number of sections equal to the number of items, the arrangement of said sections corresponding to the arrangement of said regions of the display area and each section corresponding to a respective region, and (ii) upon a user contacting a respective one of the sections, determining the corresponding item.

In either expression, the sections preferably collectively cover the whole of the continuous range, so that defining the sections is equivalent to partitioning the entire range. The sections are preferably of equal extent within the range.

The invention, in any expression above, may make it possible for the user to make a selection in a way which is intuitive and maximises the efficiency with which the data input means is used, since when the number of items from which the choice is made is low, the sections can be larger, permitting the user to choose more easily.

As mentioned above, the data input means is either a touch sensitive area or a joystick input device in which a member ("joystick") is urged from a central location in a choice of directions (in which case the sections may correspond to respective angular ranges in the direction of urging, e.g. adding up to a total of 360 degrees). Depending on the data input means, the continuous range may be a one-dimensional, two dimensional or even conceivably three-dimensional range.

The invention is particularly suitable for use in the case that the sensitive area either does not permit any information to be displayed there (i.e. it is purely a data input device and has no data output facility), or only allows a relatively small amount of data to be displayed there (e.g. the borders of the sections).

In contrast to a device having a contact sensitive display area (e.g. a touch sensitive screen), the sensitive area is different from the display area (although the two areas may optionally meet along an edge, for example). This is especially useful in the cases that (i) the display is small (on the scale of a human finger, for example) so that even if the display were touch sensitive it would not be suitable for selecting files, or (ii) the display is very large, so that it would not be economic to make all of it touch sensitive.

An example of the use of the invention is for the "items" to be data files, so that selecting an item corresponds to selecting a data file. Alternatively, each of the items may be a set of data files, e.g. a directory.

The method may be performed more than once, on each occasion selecting from items which were logically related to the item selected in the previous step.

The logical relationships may be any logical relationships (e.g. those defining a tree-structure or an approximate-tree structure). They may also be logical relationships (pre-)defined by a user or automatically, e.g. based on the meanings of the files.

The logical relationships are preferably of any type or types suitable for defining a hyperspace. Thus, the logical relationships between the files may be (or at least include) hyperlinks (preferably hypertext links) and optionally also the connection(s) between frames and the file(s) they display.

In a first example, taking the case that the logical relationships are the connections in a directory structure, a user can select any directory or other file of the directory structure (e.g. starting from the root directory) by performing the method of the invention once using as items the directories and other files (if any) in the root directory, and, in the case that a directory is selected, performing the method again using as items the directories and other files in the selected directory. This scheme may be repeated until any desired leaf node in the directory is reached.

In a second example, taking the case that the files are files of a web connected by logical relations which are hyperlinks, a user can move through the web from file to file, at each stage selecting from files which are connected by a hyperlink to the present file.

The expressions of the invention above are on the basis that the number of sections is equal to the number of items. However, especially in the case that the number of items is large, this may lead to the sections becoming small. A way of resolving this is to make the selection by a multi-stage process. For example, in a two-stage selection process, the user first selects one of a plurality of subsets of items, and then selects an item from that subset. This may be generalised to a process in which the user gradually homes in on a item to be selected, by first choosing a subset of items, then a subset of that subset, and so on until the user reaches the level of selecting individual items.

Taking this possibility into account, a third expression of the invention is a method for allowing a user to select one of a plurality of items, the method employing a device having a display area and, separately from the display area, a data input means (either a contact sensitive area which is sensitive to a contact by a user, or a joystick) which registers a selection made by a user within a continuous range, the method including at least one step of:

displaying within the display area a number of regions, each item corresponding to a respective item;

(i) defining a plurality of subsets of said regions; and (ii) defining within the continuous range a number of sections equal to the number of subsets, the arrangement of said sections corresponding to the arrangement of the respective subsets of regions, whereby the user can select one of said subsets by selecting the respective one of said sections;

optionally, at least one step of:

(i) defining a plurality of subsets of said selected subset of regions; and (ii) defining within the continuous range a number of sections equal to the number of subsets, the arrangement of said sections corresponding to the arrangement of the respective subsets of regions, whereby the user can select one of said subsets by selecting the respective one of said sections; and defining within the continuous range a number of sections equal to the number of items in the previously selected subset, the arrangement of said sections corresponding to the arrangement of the respective region representing the items, whereby the user can select one of said items by selecting the respective one of said sections.

A fourth expression of the invention is a device for allowing a user to select one of a plurality of items, the device having a display area, for displaying a number of regions equal to the number of items;

a data input means (a joystick or contact-sensitive area) which registers a selection made by a user within a continuous range (e.g. the data input device may be a contact sensitive area, different from said display area, which registers the location of a contact made by the user within the area); and a processor for
(i) defining a plurality of subsets of said regions; and
(ii) defining within the continuous range a number of sections equal to the number of subsets, the arrangement of said sections corresponding to the arrangement of the respective subsets of regions, whereby the user can select one of said subsets by selecting the respective one of said sections;

optionally, at least one step of:
(i) defining a plurality of subsets of said selected subset of regions; and
(ii) defining within the continuous range a number of sections equal to the number of subsets, the arrangement of said sections corresponding to the arrangement of the respective subsets of regions, whereby the user can select one of said subsets by selecting the respective one of said sections; and defining within the continuous range a number of sections equal to the number of items in the previously selected subset, the arrangement of said sections corresponding to the arrangement of the respective region representing the items, whereby the user can select one of said items by selecting the respective one of said sections.

In each of the third and fourth aspects of the invention, the method of the first aspect of the invention is in effect applied twice: firstly to select a subset of the items from a plurality of subsets determined by the computer, and then to select a single item from among that subset.

It should be noted however, that the present invention also covers a case in which the user determines a subset of the items in some other manner, and then uses a method according to the first aspect of the invention to select an item from within that selected subset.

A further interesting case is one in which the user uses a method according to the first aspect of the invention to select a single item from the complete set of items, the computer determines a subset of items based on the selected item (for example, according to a proximity criterion which determines which of the other items are represented by regions proximate to the region (or section) representing the selected item, e.g. have centres within a predefined distance of the centre of the selected region (or section)), and the user then employs a method according to the first aspect of the invention to select an item from that subset, this second selection representing a more definitive selection than the first.

To understand this possibility, consider a case in which the items are the 26 letters of the English alphabet, and the user wishes to select the letter "F". In a first step, the user may be presented on the screen with the 26 letters of the alphabet, and the touch-sensitive screen (or joystick input device) partitioned into 26 sections. For certain input devices, this means that the sections will be too narrow for the user to make a reliable selection, so the user, intending to touch "F" may in fact inadvertently touch a section corresponding to "E". The computer, however, may define a subset of the items proximate this selection (e.g. proximate in the sense that the sections representing to this subset of items are proximate to the selected section), such as the subset of 5 letters "C" to "G", and the user may then use a method according to the first aspect of the invention in which sections are defined in the continuous range input device, equal to in number to the number of items in the subset (i.e. 5), and the user can make a definitive selection, i.e. "F", by contacting the respective section.

A further case is when the first selection by the user is not of a single item but of a subset of the items. For example, in the case that the sections are narrow, the user may inadvertently contact multiple sections (e.g. intending to contact "F", he actually contacts at least part of the sections corresponding to "C", "D", "E", "F" and "G", thereby defining this subset of five items).

Note that in either of these two cases, the two selections (i.e. the first, which leads to the definition of the subset, and the second which leads to the selection from the subset) may be performed either by two equivalent actions (e.g. two touches to a contact sensitive area) or by a compound action (similar to a "sliding click" described below). An example of the latter case is that the user may make the first selection by touching the contact sensitive area, and the second selection by removing the contact (e.g. after changing the location of the contact).

In the latter case, the definition of the sections in the second selection is preferably such that the point in the continuous range which the user contacted to make the first selection, is within the section which represents this first selected item. For example, if the user in the first selection selects "E", and the computer generates a subset of "C" to "G", the point which the user contacted to make the first selection is preferably within the section of the input device representing "E" when he makes the second selection.

In a fifth expression, the invention proposes a computer program product (e.g. a recording medium) carrying data readable by a computer apparatus (e.g. having a contact sensitive area) to cause the computer apparatus to perform a method according to the first or third expression of the invention.

DEFINITIONS AND PREFERRED FEATURES OF THE INVENTION

By an input device with a contact-sensitive area (or touch-sensitive area) we mean a surface which registers the location of a contact made with the surface. The contact may be with a user's finger etc., or with a member manipulated by a user, such as a pen or an implement mounted displacably over the surface. The location may be measured in one dimension (e.g. a length along the surface) or in two (e.g. a two co-ordinate position on the surface).

For example, it is known to provide such an input device as a (one- or two-dimensional) array of electronic pressure-sensitive devices (e.g. embedded in an insensitive support medium), and means to determine the location of a pressure applied to the surface by a user from signals generated by the pressure-sensitive devices.

However, the invention is not limited in this respect, since there are many other ways of providing contact sensitive surface. For example, the contact-sensitive surface may be a (e.g. insensitive) surface on a contact-receiving member which is displaced by a contact it receives, and thereby makes contact itself with a touch-sensitive surface as described above. For example, the contact-receiving member could just be a layer of flexible material arranged to cover a touch-sensitive surface as described above.

More generally, the contact-sensitive surface may be a (e.g. insensitive) surface on a contact-receiving member which is displaced by contact with a user, the input device including means to determine the location on the surface of the contact, from the displacement of the contact-receiving member. For example, as described below, the contact-receiving member may be a (e.g. insensitive) circular member arranged to cant when touched. The position of the contact (along the one dimensional range which is the circumference of the circular member) may be determined using means for measuring the canting direction of the contact-receiving member.

These two forms on contact-sensitive input device may even be combined; that is, an input device with a contact-receiving member, means to determine the displacement of the contact-receiving member, and pressure-sensitive means embedded in the contact-receiving member itself.

Whether the input device is a contact-sensitive surface or a joystick, it may optionally be additionally sensitive to other user actions, e.g. in the case of the touch-sensitive surface to the degree of pressing or in the case of the joystick to the degree of urging. However, in many embodiments this features is not preferred.

Preferably the definition of sections (which are non-overlapping) is such that collectively the sections occupy a high proportion (e.g. at least 75%, at least 80%, at least 90%, at least 95%, or even substantially 100%) of the continuous range. In the preferable case that substantially 100% of the range is in one of the sections, the definition of the sections is a partitioning of the entire range into the sections.

Preferably, the data input means and the display are portions of a single unit. For example, as described in detail below, the device of the invention is preferably a small (e.g. hand-held) item of consumer electronics, such as a mobile telephone, having a body and the display and the data input means are both fixed to (e.g. mounted on or in) the body. In a preferred case, the data input means is a loop-shaped touch sensitive area which encircles the display area (or at least substantially loop-shaped, so that the loop contains a gap and subtends, say, at least 300 degrees around the display area). It may be rotatable (in its plane about a centre of the loop), and cantable.

Note that the types of data input means mentioned above both allow the user to successively select sections of the continuous range which are not adjacent. This is true, for example, of a contact sensitive area, since a user can successively contact any two points on the area. It is true also of a joystick indicator, in which the range is taken as the range for the circumferential angle of the joystick around the central position of joystick indicator. A joystick can move from any circumferential angle to any other circumferential angle through the central position. It is not true, for example, of a standard "button" rollerball or mouse indicator, which can only move continuously. The possibility to select portions of the range which are not adjacent allows "parallel" access to the items (rather than "serial" access to the items) in the sense described below.

Preferably, the data input means is capable of registering more than one type of selection from the user. For example, the data input means may comprise, in addition to the element defining the continuous range, one or more keys which a user may depress. More preferably, the data input means may allow the user to select a location in the continuous range in more than one way. For example, in the case that the data input means is a sensitive area, it may be able to distinguish a short duration contact from a long duration contact, and/or a low pressure contact from a high pressure contact. Thus, for example, the user may be able to input a first instruction selecting (e.g. provisionally) an item by a first type of contact (e.g. indicate an item and instruct the device to generate information about it, by lightly moving his finger onto the respective section of the sensitive area), and input a second instruction selecting an item by a second type of contact (e.g. instructing the device to open a data file represented by a section of the sensitive area, by sharply and firmly tapping on the respective section of the sensitive area). The two types of contact facilitate the "sliding click" technique described below.

The regions are preferably arranged along a path in the display, which may be fixed in the device, or adjustable (e.g. by a selection by a user). The path may be what is called "continuous" which means that the path itself is independent of the number of regions to be displayed, but when it is desired to display a certain number of regions, the path is partitioned into that number of elements (e.g. of equal length), and a region is drawn in each path element. Alternatively, for each possible number of regions up to a maximum, there may be a predefined arrangement of that number of regions (e.g. in the formation of the pattern of a die). This letter possibility is here referred to as a "discrete" arrangement.

Note that to define the positional relationships (e.g. angular relationships) of two regions clearly and unambiguously, it is helpful to define an "origin" point (or "centre" point) in each region, and state that the angular relationship of two regions is used to mean the angular relationships of the respective "origin" points. The "origin" point may be unambiguously defined in any of a number of ways, for example (i) the centre of gravity of the regions, (ii) the centre of gravity of a convex hull around the regions, or (iii) in the case that the regions are of a predefined shape and orientation a predefined position on the regions (e.g. bottom left-hand corner). Note that the concept of a two-dimensional arrangement of regions can also be defined as one in which the centres of the regions are not all (substantially) on a straight line in the map.

The items may be data files of any type, e.g. stored in a memory of the device or in a location remote from the device but accessible to the device. For example, if the device is a mobile telephone, the device may be able to access the files by radio.

In the case that the items are data files, the user is preferably able to move to a data file by selecting a data file using the method of the invention. The term "moving to a data file" is used in this document to imply that a user can obtain a least some information concerning the file. For example, it includes the user registering an interest in a particular file, in response to which the method generates at least some information concerning the file, such as its title or a precis. The term "moving" further includes within it "opening" a file, that is to say obtaining full information from a file (e.g. in conjunction with another program). Preferably, in all expressions of the invention when the user has the option of selecting and thus moving to a given file, he or she also has the option of opening it.

In the case of a file which stores data for interacting with an application (e.g. a graphics file may contain data in a format such that the graphics file can be opened by a graphics program; a Word file can be opened by the word processor Word; etc.), "opening" includes transferring the data in that data file to the compatible application, so that the user (or another user) can access the data in the data file via the application.

Thus, the user may be able to move to any data file. For example, in the case that the data files are a directory structure, the user may be able to move to any directory of the directory structure and to any leaf node. The user preferably has the option of opening that file.

Instead of the items being complete data files, some or all of them may be portions of one or more (e.g. large) files. In this case the logical connections are links between the portions of the file. For example, if a single large file contains a diary representing a plurality of days, the method may be used to map logical relationships (cross-references) between the days. In other words, although in some forms of the invention the data files are separate (e.g. electronic files provided on different respective servers and/or files related only by the logical interconnections), one or more of the plurality of files may alternatively be respective portion(s) of a larger data file (or files). For example, the term "moving between data files" should be understood to include not only moving between data files which are separate (e.g. which are provided on different servers) but also data files which are themselves part of a single larger data file.

The segments may, for example, represent portions of a structural item of computer language (e.g. a program) in any programming (or content presentation) language, stored across one or more data files, and the logical relationships may be the conceptual structure of the item (e.g. which portion of a program "calls" which other).

In an especially preferred case, the items are data files (or portions of data files) of a web, such as the world wide web. Thus, the invention may alternatively be expressed as a method and apparatus for moving to (e.g. opening) data files of a web.

The user may be able to continuously vary the selection he makes in the continuous range of the data input means. For example, if the data input means is an area, he may be able to slide his finger along the area. As the user varies his selection, for example, regions into which the user's selection moves may be highlighted. Following this continuous variation, the user may make a second sort of selection as a discrete selection, e.g. a definitive selection of an section. This is here called a "sliding click". For example, in the case that the continuous selection is by varying a point of contact with the sensitive area, the second sort of selection may be tapping harder on the sensitive area, or even discontinuing the selection (i.e. raising his finger from the sensitive area).

In all expressions of the invention, the user's selection of an item may be by first indicating a location in the continuous range which causes significant data to be displayed about one or more of the items (without the map being otherwise redrawn, e.g. except to indicate the so selected item), and then on the basis of this data choosing one of those one or more items (e.g. a data file to be opened). This first and second selection may be a "sliding click" as described in the previous paragraph. The display of significant data significantly increases the accuracy of navigation to an item, even in the case that the data which can be displayed by the display at any moment is severely limited.

Alternatively or additionally, a user may be able to indicate using the data input means, one of the items and issue an instruction (e.g. by a separate button or a certain sort of motion on the data input means) to cause the display to display respective regions representing additional items logically related to the indicated item which were not previously represented. For example, in the case that the items are data files, the additional items may be data files logically related to the indicated file. This set of files is here called a "hidden layer".

The device may be an item of consumer electronics, such as a portable device of any size ("micro" size such as a mobile telephone, "mini" size such as a personal digital assistant ("PDA"), or "macro" size, such as a laptop), a fixed installation, such as a PC, a digital TV, a kiosk, a public address device or a home network. It may be a control terminal such as a games console or remote control. It may be alternatively be fitted as a component of a consumer data network, e.g. in-flight entertainment on a plane, train, car, etc., or in relation to the world wide web as a computer running server side software, client side software or a custom site development. Furthermore, the device may be part of, give access to or facilitate the management of any other data collection or network which may for example be based on the functioning of a physical hardware network (satellite, telecom, cable or broadcast networks, traffic or data flow control systems, intranets or other private or proprietary networks such as Reuters, and data libraries such as Corbis) or may be a means of access to content presented through a computer (e.g. www sites, CD-ROMS, reference aids), or a component of task specific software running on a computer (e.g. networked software, e-commerce software, menu or tool bars, data analysis tools).

In one embodiment, the device is a mobile telephone. The latest generation of mobile telephones includes both a memory (organised in a directory), (radio) access to a remote station where further information is stored, and the facility for accessing email and other internet systems. However, the usefulness of any of these facilities is severely limited by the size of the display device of a mobile telephone, which itself is limited by engineering constraints and present technology. By providing a mobile telephone with a display generated according to any of the methods of the invention defined above, the technical usefulness of the mobile telephone as an apparatus for transferring data is significantly enhanced.

By "low resolution screen" may be meant a screen with a low resolution in absolute terms (e.g. with no more than 500×500 pixels, no more than 200×200 pixels or even no more than 100×100 pixels) or one with a low resolution in relation to the number of files to be mapped (e.g. a total of no more than 10, 25 or 100 pixels per file).

As mentioned above, it is possible for the data input device to define a one-dimensional range. This range may be an "endless range", that is with two ends which meet. For example, the data input device may be a sensitive area which is a (e.g. circular) loop. In this case, the sensitive area may even encircle the display. For example, the device may be mountable on a wrist, like a wrist watch, with a face which provides a display and a sensitive area encircling the display, e.g. as a bezel of the device.

Use of the Invention in Combination with a Fractal Space Map

The invention may be used in combination with a "fractal space map" of PCT/GB99/02820.

That is, when the items are a plurality of second files logically related to a first file, the "regions" mentioned in the expressions of the invention above are referred to as "second regions", which are are displayed according to a distance scale referred to as a "first distance scale".

For an integer n and i=2, . . . ,n, for the or each i-th file, one or more (i+1)-th regions are displayed, said (i+1)-th regions respectively representing one or more (i+1)-th files which are logically related to the i-th file, and being spatially related to the i-th region representing that i-th file, the sizes of said (i+1)-th regions being according to a respective i-th distance scale smaller than the (i−1)-th distance scale.

The value of n may be as low as 2, but it is preferably higher (e.g. at least 3, at least 4, or even at least 10), and may be indefinitely large. n may depend upon any one or more of: (i) the resolution of the user's screen, (ii) the computer resources available for creating the display, (iii) the number of files a certain number of clicks away from the first file, or (iv) a selection by the user.

A preferred case is that the map is drawn for a certain predetermined value of n selected by the user, and then the user has the option of increasing n by one, so that the map is re-drawn with this new value of n, thereby to include files one further logical link away from the first file.

Since the value of n may be chosen to be small (independent of the number of data files) the map may be drawn even on a screen with very limited display capacity. Below, preferred features of the display are listed which further improve the potential of the mapping method, especially in the specific technical case of a display of limited technical capacity (either in absolute or relative terms).

The "size" of a region may for example be the extent of the region in a predetermined direction. The extent of one or more (or all) of the regions may by substantially equal in two orthogonal directions, and in this case the "size" may be the extent in either direction. It may also be the area of the region.

Any file (e.g. a j-th file where j is an integer) can be reached by performing a method according to any of the above expressions of the invention (j−1) times, to successively select files in the path which leads to the j-th file. That is, for k an integer and successively k=1, ..., j, the method is performed for each k, whereby the user selects, among the (k+1)-th files (or portions of files) logically related to a previously selected k-th file (or the first file in the case of k=1), one of those (k+1)-th files.

The data files may be part of any hyperspace of data files. For example, the data files and the logical relationships between them may be a (hierarchical or tree-like) directory structure; in this case the logical relationships between the data files may be the links of the directory structure. For example, they may be part of a directory structure containing at least 4, at least 6, at least 10, at least 20 or at least 30 levels. In this case the number of data files in the directory is well-defined (countable), and may be at least 30, at least 100, at least 500, at least 1000 or at least 2000.

Alternatively, if the data files are files of the world wide web. In this case the total number of data files, in the case that n is very high, and practically uncountable.

Alternatively the data files may be part of any other hyperspace of data files which is not (or not necessarily) hierarchical, for example a web which is internal to a large company or government department. For example, the data files may be data files connected by hyperlinks (preferably hypertext links), which constitute the logical relations.

The plurality of files are preferably provided at a plurality of web sites (that is, a plurality of web domains). The files may, for example, include files of the world wide web provided at different sites by spatially separated servers.

The logical relationships may be any logical relationships (e.g. those defining a tree-structure or an approximate-tree structure). They may also be logical relationships (pre-)defined by a user or automatically, e.g. based on the meanings of the files.

The logical relationships are preferably of any type or types suitable for defining a hyperspace. Thus, the logical relationships between the files may be (or at least include) hyperlinks (preferably hypertext links) and optionally also the connection(s) between frames and the file(s) they display. More preferably, the logical relationships are such that each i-th file and its one or more (i+1)-th files are such that the (i+1)-th file can be reached from the i-th file by one click. That is, they are connected to the i-th file by a single hyperlink connection.

Thus, if n were indefinitely large, the entire world wide web (all files which can be reached by any number of clicks) could in principle be represented by the display generated by the method. In practice, only pages up to, say, n=10 clicks away may be displayed (or those which generate regions having say a radius larger than 5 pixels), but this nevertheless may mean a very large number of pages.

Note that the i-th distance scale may be different for different i (e.g. it may depend upon the number of (i+1)-th files. For example, in the case that there are a large number of (i+1)-th files logically related to a given i-th file, the i-th distance scale may be small, e.g. so that there is space to represent all the (i+1)-th files.

We will now define some useful terminology: for a given data file, its "parent" files are all files (e.g. in a certain map) from which it can be reached by one logical relation (e.g. one clicks), while its "ancestor" files are all files (e.g. in a certain map) from which it can be reached by any number of logical relationships. Its "sibling" files are files sharing at least one parent. Its "child" files are those files to which it is a parent. Its "descendent" files are those files to which it is an ancestor.

For any fractal space map, the "origin" of a data map is the file from which distances in terms of clicks are measured (e.g. the "root" directory of a directory structure, or in some embodiments the web browser location). The "base" is defined in relation to a particular map and is equivalent to the first file drawn. The "focus" is the user's current "location" within the map. The "highlight" is the area, label, or other identifying device that is at any one time highlighted, or indicated for immediate selection, by the user.

Also, although the method does not draw regions for a number of clicks greater than n from the first file, the method may not necessarily draw regions for all files up to n clicks away from the first file. For example, in that case that there are a large number of (i+1)-th files are logically related to a given i-th file, and each (i+1)-th region is small (e.g. below a predetermined size), (i+2)-th files logically related to these (i+1)-th files may not be displayed.

Thus, this is a possible criterion for not representing certain files. Another possible criterion is that if the same file would be represented more than once (because it can be reached from the first file by more than one route) all but one of those representations may be omitted. Alternatively, regions representing its children may be omitted from all but one of its representations (that is, the criterion for omitting files is that (i) the file would otherwise be shown elsewhere and also that (ii) the parent would be represented more than once).

Note that the logical relations are preferably those which are uni-directional. That is, even if a first file is logically related to a second file, this does not imply that the second file is logically related to the first. An example of such a logical relationship is a hyperlink.

The term "file" as used herein includes "frame set" within its scope. If a given file is a frame set, the region which represents the file preferably indicates this. For example, in the case that an i-th file is a frame set partitioned into j sections (here numbered k=1, ... j), the i-th region which represents the i-th file is preferably shown partitioned into j sections (k=1, ..., j). The (i+1)-th regions are then drawn accordingly, so that the (i+1)-th regions which represent those files which are linked to the i-th file by anchors within the k-th section of the i-th file, are within the k-th section of the i-th region.

A further alternative is that the logical relationships may not be predefined (e.g. by hyperlinks), but rather depend on the meanings of the files (e.g. a thesaurus), and even be chosen by the user. For example, if the information stored in the data files concerned companies and their employees, the user could define a rule such that:

"A second data file is logically related to a first data file, if and only if either the first represent an employee and the second a company the employee has worked for in the past, or the first represents a company and the second a current employee of that company."

The user may optionally select the logical relationship from a number of predetermined options.

The first file may be a file which is currently being displayed by a user (e.g. a data file which corresponds to the user's present (system or net) browser location). Alternatively, it may be one selected by the user, as described further below. In either case, the methods may create a map based on a first file and indicating the existence and distance (e.g. measured in clicks) of other files related to the first file.

We will now discuss a number of geometrical features of the map which have significant technical consequences and which are preferred features of a fractal space map.

The number of n-th files rises approximately exponentially with n, so for large n, to avoid the display becoming larger than the user's screen, the distance scale must decrease accordingly. For example, the distance scale may be chosen to decrease such that the total area of the map is "bounded", by which we mean that no matter how great the value of n, the total area of the display never exceeds a predetermined value.

As one example of a bounded map, the distance scale may be chosen such that the total area of the one or more (i+1)-th regions for each i-th file is less than (e.g. half) the area of the i-th region representing the i-th file.

In this case, the (i+1)-th regions for each i-th file may be non-overlapping and all within the i-th region which represents that i-th file. However, this is not the only possibility: for example, the (i+1)-th regions for each i-th file may be arranged to cluster around the i-th region which represents that i-th file, or the (i+1)-th regions may each partly overlie the i-th region.

The display generated by the method may thus have an appearance resembling a "fractal" form, that is with an increasingly detailed (scalable) structure (the number of i-th regions rising with i) on an increasingly small distance scale (for example, the width of an average i-th region). For high enough n, every file accessible by clicks within the world wide web would be represented by one or more regions in the fractal-like display.

For example, as described above, in the case that the (i+1)-th regions for each i-th file are always within the i-th region which represents that i-th file, the map will be generated entirely within the first region, and the total area occupied by the regions (e.g. the sum of all points which are inside at least one of the regions) is equal to the area of the first region. This is true whatever the value of n, and however many regions there are for each value of i.

This feature, of the total area occupied by the regions of the map being independent of n, is herein called "intensiveness". Any map in which the total area occupied by the regions of the map (i.e. the total area which is inside at least one region) does not depend upon n (at least for n greater than some certain value, in this case n=1), is herein called "intensive".

For each i-th file, the (i+1)-th regions preferably do not overlap one another and their areas are preferably equal to each other, but the (i+1)-th regions for first i-th file may be of a different size to the (i+1)-th regions of a second i-th file. More generally, the i-th distance scales may be different for different i-th regions. For example, if there are 20 files one click away from a first i-th file, and 10 files one click away from a second i-th file, then the area of the 20 (i+1)-th regions for the first i-th file may be smaller than (e.g. half) the area of the 10 (i+1)-th regions of the second i-th file. More generally, the areas of each of the (i+1)-th regions for an i-th file are preferably selected to be less than the area of the i-th region which represents that i-th file by a proportion which depends in a predetermined way on the number of (i+1)-th regions for that i-th file. For example, in the case that the (i+1)-th regions for a given i-th file are within the corresponding i-th region, the (i+1)-th regions may be as large as possible within the constraint of a predetermined size and arrangement rule.

Furthermore, it is possible for the (i+1)-th regions related to a given i-th region to be of identical sizes, or of differing sizes from each other (e.g. to indicate that the number of times that they have been visited) but defined based on the same distance scale. For example, the respective sizes (e.g. diameters) of the (i+1)-th regions of a given i-th file might be defined as the i-th distance scale multiplied by value which is a function of a variable characterizing the respective (i+1)-th file (such as the number of times the corresponding (i+1)-th file has been visited).

The (i+1)-th regions are preferably arranged along a path which may be continuous (open or closed) or discrete, as described above. For example, in some embodiments, some or all of the regions are circular, and in this case the (i+1)-th regions may be circular regions arranged around the inner periphery of the circular i-th region, touching the outside of the i-th region and with each (i+1)-th region touching or proximate to two neighbouring (i+1)-th regions. This is an example of a closed continuous path.

A property related to, but logically distinct from, the arrangement of the regions (described above), is here referred to as "angular invariance", and is a preferred feature. "Angular invariance" means that for all i (or at least for i within a certain range) the arrangement of the (i+1)-th region(s) in spatial relationship to the corresponding i+th region is independent of the value of i (neglecting distance scales). This feature means that if the map is redrawn using a data file other than the first file in place of the first file, the result is a second map which is (e.g. substantially) a magnification of the part of the first map corresponding to the first file.

For example, suppose that a first map includes a second region (representing file "A"), and that there are a number of files "B" logically related to file "A" and therefore drawn as third regions in the first map. If the map is re-drawn treating "file A" as the first data file, the spatial arrangement of the new second regions (i.e. the regions representing the files B) is equivalent to the spatial arrangement of the regions representing files B in the first map. Similarly, the fourth regions in the first map representing files logically related to the files B, are transformed into third regions in the second map, but maintain their relative spatial arrangement and/or shape. And so on. In summary, the part of the first map which is the second region representing file A, and all (or most) regions spatially related to that second region, and all (or most) files spatially related to them, are expanded, but not relatively rearranged. That is, although the size of the regions respectively representing the files B is changed, and the distance between those regions is changed accordingly, the angular relationship between them (and preferably also between them and the region representing file A) is invariant.

Angular invariance may include invariance ("directional invariance") in relation to a predefined direction in the map (e.g. the horizontal axis of the screen) so that the relative angular locations of the (i+1)-th regions in the second map in relation to the predetermined direction are the same as their angular locations in the first map relative to the predetermined direction (e.g. if one imagines a polygon having as its vertices the centres of the (i+1)-th regions, that polygon is magnified and displaced in the second map but is substantially not deformed, and substantially not rotated relative to the predefined direction).

Angular invariance (especially in the case of directional invariance) has the technical advantage that redrawing of the map starting from a particular descendant redraws that region and its descendants in the same way (e.g. substantially) as they would have been if the part of the original map comprising that region and its descendent been simply magnified (scaled up). This prevents a user of the map being disorientated by the transformation.

In either case, the rule may be dependent upon the number of regions to be arranged, but is substantially not dependent upon the distance scales (i.e. the value of i).

Further preferred features of the fractal space map are that:

1) At least one (preferably most, more preferably all) region(s) (other that the starting area) (and preferably also its children, and more preferably also its descendants) do not change shape if the map is redrawn with that region as the starting point ("morphic invariance"). This feature makes it very much easier to "zoom into" (or out of) the map, without losing orientation. It is especially advantageous in combination with the angular and directional invariances.

2) The siblings (and in addition in order of preference the parent, ancestors, children and/or descendants) of the region representing a given file do not change shape if the map is redrawn omitting that region map is redrawn ("stability"). This is useful, for example, in the case that while a map is in use a new data file is added or subtracted from the network or directory, and also in the case of certain of the maps described below in which there is the option of redrawing a map without a certain file being represented.

3) The children ((i+1)-th files) of at least one (preferably most or every) i-th file are laid out along a continuous closed path (e.g. a closed loop around the periphery of the i-th region) or sequentially at a finite number of predetermined ordered positions (e.g. in positions corresponding to the keys one to nine on a standard 3×3 numeric keyboard). This is a highly preferred feature of maps according to the invention.

4) The area of the map representing a given i-th region (excluding the total areas representing all its children and their descendants) is at least half as large as, preferably at least as large as (for example at least twice as large as) the area representing any one of its children and that child's descendants ("perspective"). This feature makes it easy to indicate (e.g. by clicking) any one of the i-th regions at any level, and it in contrast to the tree map in which the region representing a given directory is usually fully tiled by its descendants.

Although, as explained above, it is possible for all the (i+1)-th regions to be according to the same (i-th) distance scale even if they are descendants of different i-th files (e.g. to have exactly or approximately the same diameter), this is not a necessary feature of a fractal space map. Rather, (i+1)-th regions representing files logically related to different i-th files may have different (or even unrelated) sizes. That is, the i-th distance scale may be different for different respective i-th files. However, in this case too the area of the regions preferably has the boundedness property, and more preferably the intensiveness property, discussed above.

The user may have the option of redefining any of the rules determining the shape of the regions and for their size and/or their arrangement within the display. For example, he may have the option of changing between circular regions and regions of any other shape, such as squares.

It is also possible that the rules of shape and/or arrangement of the i-th regions depend on i, e.g. to be different for i=n, or to be dependent upon some other factor. For example, if the regions are circular for all i up to n−1, the n-th regions may be chosen to be complementary sectors of the corresponding (n−1)-th regions. Furthermore, the (i+1)-th regions for different i-th files may be respectively of different shapes.

Optionally, the methods may not display regions for all the (i+1)-th files logically related to the i-th file, but may neglect certain of those files, for example according to one or more predefined or re-definable criteria.

For example, it is possible that a hyperlink from a first file leads to a second file, and that a hyperlink from that second file leads back to the first file, so that first file is in a sense also a third file. In this case, the methods may not display the first file as a third region. As a second example, often a given third file can be reached from the first file in two clicks via two different second files. The methods may in this case display only one third region, in or near only one of the two possible second regions. In other words, the method may include steps of determining if regions corresponding to i-th files have already (for equal or smaller i) been displayed, and modifying the display accordingly.

A further possibility is for there to be a predetermined (e.g. selectable by the user) maximum number of (i+1)-th regions displayed for each i-th region. For example, if there are more than a predetermined number M of (i+1)-th data files logically related to a given i-th file, the method may only display M (i+1)-th regions, respectively representing only M of those (i+1)-th files. For example, if the i-th region was a square, the method might only display eight square (i+1) regions, arranged along a square path along the internal periphery of the i-th region.

The map may include one or more (or even all) region drawn which do not represent a single respective file in the original data structure, but rather represent collections (or even collections of collections) of (i+1)-th files. For example, if there were 15 (i+1)-th files to be mapped in the example given above then seven (i+1)-th regions may represent seven of the (i+1)-th files and an eighth region may represent the remaining eight (i+1)-th files, and have drawn within it eight regions respectively representing the eight remaining (i+1)-th files. Alternatively, as a second example, if there were say 64 (i+1)-th files to be represented, the eight (i+1)-th regions may alternatively each represent eight of those (i+1)-files (i.e. the first (i+1)-th region the first eight (i+1)-th files, the second (i+1)-th region the second eight (i+1)-th files, and so on).

A user can produce a fractal space map of the part of the web near his current location (for example for navigating within the web). Suppose, for example, that the user has just changed his location in his (system or net) browser to read a given file. He may then have an option, for example by performing a certain mouse click, of causing his terminal to perform the method of the invention described above, using the file the user is reading as the first file, to generate a map of the files up to n clicks away. This would immediately tell him, for example, about the number of files a given number of clicks from his present location, and could allow him to open quickly any one of them into his browser (e.g. by clicking his mouse on the relevant region).

If the user wants more detail, he may have the option of selecting a certain file, for example by selecting a file as described above, and causing the terminal to generate another fractal space map using his selected file as the first file.

The methods of the invention expressed above may further include displaying characteristics of the files represented by the some or all of the regions, so as to facilitate navigation of the web or other file structure.

For example, the regions may be displayed in a colour which indicates a characteristic of the corresponding file, for example the site of a given file, or the server which provides it.

Furthermore, the user may be able to call up or have displayed automatically further information on a file using the corresponding region, for example by moving his mouse to that region on the display and perhaps additionally performing a mouse clicking operation. This could cause information to be displayed, such as the title of the file. The user might also be able to call up further information, for example by a different or more complex mouse clicking operation. This more detailed information may be displayed in a part of the display outside the first region, for example as a separate box displayed to the user in a different part of the screen. The more detailed information might for example include any combination of the title of the file, its address, a precis of it, or details of the specification of the file (e.g. technical information including the data format of, say, images referenced in the file).

The information which is displayed by the method of the invention, such as the existence of the files which can be reached by any number of clicks, together with any characteristics of those files, may be derived at the time when the methods according to the invention described above is performed (i.e. as additional steps in that method). Alternatively, it may be pre-generated, for example during times in which the apparatus is idle, so that it is immediately available, when the mapping method is performed.

The method may include a step of storing the information, so that it can be recalled if a user returns to this section of the web. The storage could for example be in a location accessible only to one user (e.g. on a user's device), or in a location accessible by several users. The data stored may be collected and maintained on the basis of the movements of one or more than one of the users, or one some other basis, such as maintaining an up-to-date map of the pages in a particular site, or those stored one or more than one server. The collection may be performed on request or automatically by one or more (e.g. spatially separated) devices. For instance each collection device might be located on the server whose information it collects. In this and similar cases there would normally be a step of collating the information collected by distinct devices.

Such stored information could be automatically removed, for example after a predetermined period, if the user has not returned (or if no user has returned) to that area of the hyperspace. Alternatively, if a user accesses a particular area of the web frequently, the information concerning that section of the web could be stored such that it will not be discarded. If the web subsequently changes in that location, for example due to the addition of a new file or a new anchor, the stored information could be updated, or regenerated, accordingly.

Since the fractal map is relatively complex, the display may display, for each item from which the user is selecting at any moment, an additional region representing the respective item. Preferably, the arrangement of the additional regions corresponds to the arrangement of the sections, and preferably the additional region is highlighted when the user selects the corresponding section of the range, as described above. For example, if the user has is selecting a fourth-file from the children of a given third-file, the invention may include displaying a respective additional region for each of those children, and the additional region may be highlighted at the same times as the third region.

Preferably, each additional region is representing showing data indicating the significance of the respective (j+1)-th file.

The fractal space map may be able to reject (i.e. not include in the map) files according to their type. For example, especially in the context of the web, the map may consistently ignore audio and/or picture files, so that a large click distance can be displayed without over-complicating the map, or may create an additional region to representing files (or containing files) of a certain (e.g. predefined) type.

In all fractal space maps when a region can be reached from (i.e. is logically related to by an arbitrary number of steps) the first file along two or more different paths, it may be represented only by a single regions (i.e. showing one possible path), and regions which indicate other paths may be omitted. Alternatively, more than one such region may be drawn for that file. In the latter case, (i) the descendants of that file may be drawn in only one of the regions, or in more than one, and/or (ii) when a user indicates one such region (e.g. by moving a mouse over it), regions representing the same file may be highlighted, inserted into the map, have its descendants drawn within them, and/or have some or all of its parent regions indicated (even if a copy of the particular region in question is not drawn). In this way the networked, rather than hierarchical, nature of the logical connections can be clarified to the user.

It is possible for the map to display (e.g. by a separate display panel) information concerning data files which have a value of i greater than n (that is data files which are not represented on the map of the invention). For example, the user might have the option of displaying information concerning data files for which i=n+1, by for instance positioning his mouse over a file for which i=n. This i-th layer is referred to as an "invisible layer" or "hidden layer".

As explained above, the invention is not limited to mapping a plurality of data files, but may alternatively map segments of a single data file, or segments of a plurality of data files. One possibility is for these segments of data file(s) to represent the respective portions of a computer program. For example, each segment could be a portion of a data file containing a particular sub-routine. The logical relationship between portions of the program (for example the occasions at which sub-routines can be called) represent another set of logical relationships which can be mapped by a method according to present invention. Any programming or content presentation language grammar or code instances can be represented in this way, for example the inventor has found it to be particularly appropriate for a HTML structure.

A given program may be distributed through one or more data files in a way which is not related to the conceptual structure of the program (e.g. some subroutines may be a complete data file; other subroutines may be only a segment of a data file; other subroutines may be distributed over several data files). Despite this, the user may be able to select the logical relation between the segments of the data files (or complete data files) to be the conceptual structure of the program, so that the regions of the map correspond to sub-routines and the map is drawn based on a single subroutine (playing the role of the first data file).

Use of a map of this kind can facilitate the design of a (web) page, including its layout, e.g. in HTML. In the case of producing a display including a map produced according to the invention, a further part of the display area may represent the page(s) which the language generates on a user's screen. The user may have the option of indicating a portion of the map (e.g. by a mouse movement, or pressing one or more keys), and in this case the portion of the page(s) representation associated with the portion of the program corresponding to the region of the map generated by the user, may be highlighted.

As discussed above, the fractal space need not be the whole of the display generated on the user's screen. Furthermore, in mapping a set of data files a map according to the invention may be used to map files up to a value of i=n and some other mapping scheme may be used to map files for higher values of i.

More generally, a fractal space map may map (i+1)-th files having a logical relation to an i-th file in the ways described above for i in the range j, . . . , n where j is an integer greater than 1, and according to a different scheme (e.g. not having a decreasing distance scale) for i outside this range. In principle, the map could even be generated, within the scope of the invention, with regions having a decreasing scale (e.g. decreasing size) for values of i within a plurality of ranges, and according to a different drawing scheme (e.g. the hyperbolic map scheme) for i outside these ranges. This sort of map is here termed "partial".

BRIEF DESCRIPTION OF THE FIGURES

Preferred embodiments of the invention will now be described for the sake of example only with reference to the accompanying figures in which:

FIG. 3 shows a device according to the invention;

FIG. 4 shows a method according to the invention for selecting from five items;

FIG. 5 shows another method according to the invention for selecting from five items;

DETAILED DESCRIPTION OF PREFERRED EMBODIMENTS

Figure 1:
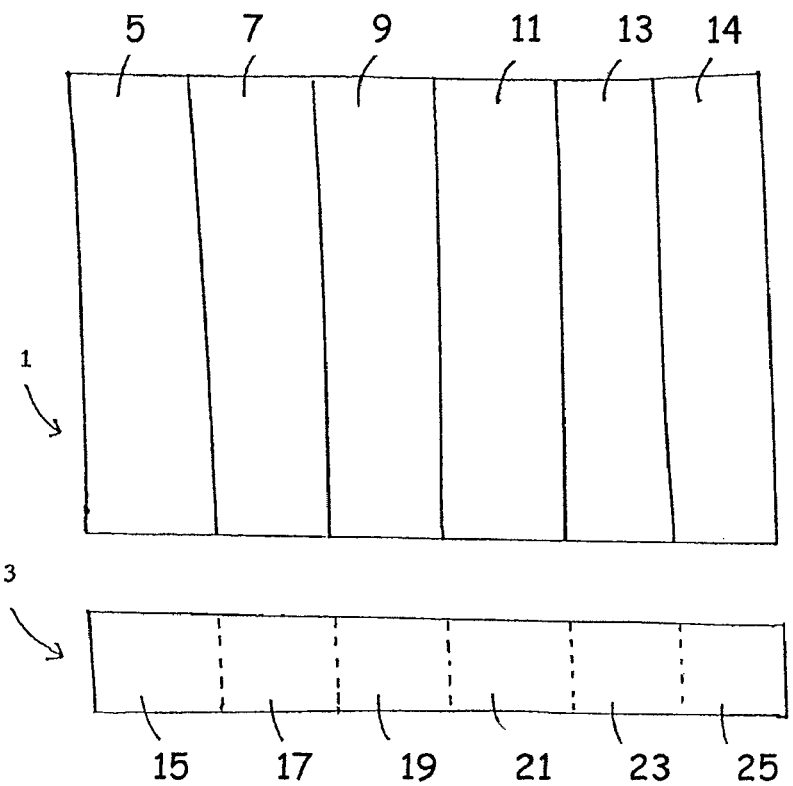
FIG. 1 shows a method according to the invention for selecting from six items.
Figure 2:
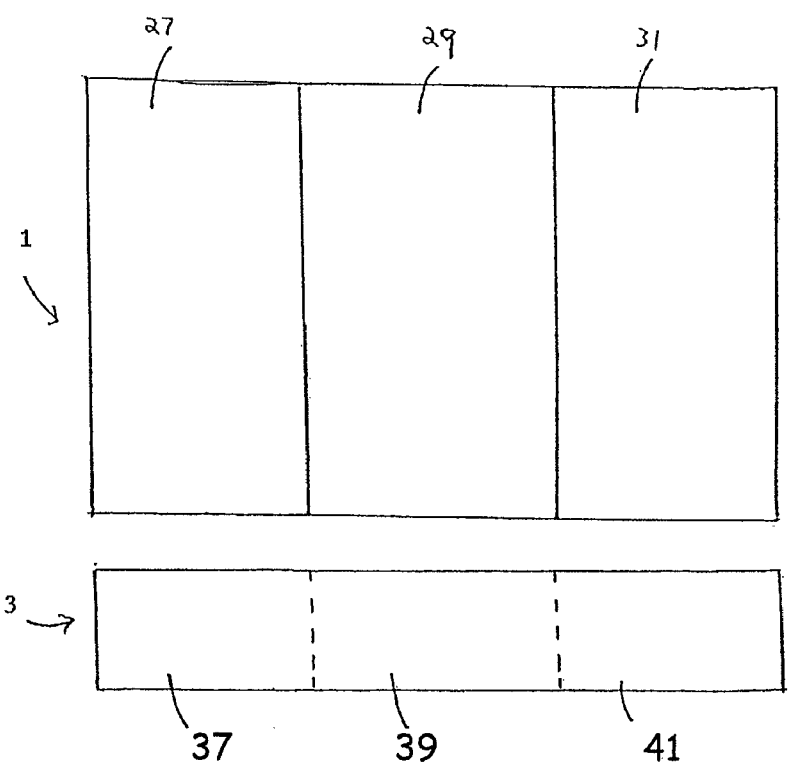
FIG. 2 shows a method according to the invention allowing a selection from three items.

FIGS. 1 to 3 show a first embodiment of the invention, which is a device 45 having a display screen 1 and an area 3 which is sensitive to a contact by a user (e.g. a contact from the user's finger, or for example a pointing device such as a pen). In this embodiment the area 3 is purely an information input device, and does not itself display any data. The device 45 may further includes keys 2,4,6,8 which the user can depress to effect functions, and optionally (possibly instead of the input device 3) a continuously variable indicator 10, such as a rotatable knob, which allows a continuous one-dimensional adjustment. This is here referred to as a "knob". The device may further have (again optionally instead of the display 3) a joystick indicator.

FIG. 1 is a simple example of the invention, and is used to discuss features which are applicable to the other, more sophisticated, embodiments. FIG. 1 illustrates a case in which the user is to choose between six alternatives (which may for example be files stored in a memory of the device 45. The screen displays six regions 5,7,9,11,13,14 in a straight row. These regions are distinguished from each other on the screen, which may be done in any of a number of ways. For example, the regions could be displayed in different colours (e.g. each coloured differently from every other, or in colours which alternate along the row of regions 5,7,9.11.13.14). Alternatively or additionally, the regions may all be slightly smaller than shown in FIG. 1, so that they are each (e.g. entirely) surrounded by a margin, so that the margins space the regions 5,7,9,11,13,14 apart. In this case, for example, the regions 5,7,9,11,13,14 may all be in the same colour. This latter case is particularly relevant if the display is a two-colour (e.g. black-and-white) display, such as a two-tone LCD.

To choose one of the regions, the user contacts the sensitive area 3. A processor inside the device 45 recognises the location of the contact, and determines how far along the horizontal length of the area 3 it is (in practice, the contact will itself have a horizontal extent, e.g. the width of the user's finger, so the processor may determine a central point in the contact area, e.g. the horizontal centre of the contact extent, and take this as the point of contact).

Since there are six regions 5,7,9,11,13,14, the processor notionally partitions the horizontal length of the sensitive area 3 (a continuous one-dimensional range) into six sections 15,17,19,21,23,25, respectively corresponding to the six regions 5,7,9,11,13,14. The processor determines which of the sections the contact was made in, and accordingly determines which item the user selected. For example, if the user contacts section 17, the processor takes that as a selection of the item represented by area 7.

An alternative to the above scheme is that the sensitive area 3 may recognise two forms of contact: (i) a long-duration contact, and (ii) a short duration contact. The user may slide his finger along the sensitive area ("long duration contact") successively indicating the regions 5,7,9,11,13,15, and the device may highlight the respective region (this is a provisional selection of a region). When the user has thus confirmed which location on the area 3 represents a given region he wishes to select, he may definitively select the region by tapping at that location ("short duration contact").

As described below, the long duration contact may not only highlight a region, but may cause significance data relating to the item represented by the region to be displayed. Selecting one of the files based on this significance data, e.g. using the long duration contact, is a form of sliding click. Instead of (or in addition to) a "long duration" contact, the device may be sensitive to two (or more) pressure levels on the area 3, a light touch (which may for example be used to cause highlighting of one of the regions) and a heavy touch. In this document, the application of a heavy touch moved across the sensitive area is referred to as "dragging".

Another feature applicable to this embodiment, and to all the other embodiments below, is that information about any of the items may be graphically displayed, for example by colouring. The information may for example indicate which two server has supplied the respective file or some measure of the anticipated relevance to the user of a respective file. Another area of the display may include a key for the meaning of these symbols. Rather than colours, the regions may be differentiated by patterning (e.g. hatching, as shown in the Figure), flashing, shape, or by any other graphical means.

In either case, FIG. 2, by comparison, shows a situation in which there are three items from which the choice is made. The screen 1 displays three regions 27, 29, 31 in a straight row. In this case the processor notionally divides the area 3 into three regions 37,39,41 in a row, and determines in which of those three regions the contact is made. These possibilities apply to all the following embodiments.

In FIGS. 1 and 2, the regions are in a straight row, and the sections are also in a straight row. However, this is not the only possible arrangement in which the layout of the regions and the layout of the areas correspond. In FIG. 3 the regions are laid out along a continuous path, which is to say that there is path (indicated in FIG. 3 as the dashed line 40) defined in the display (e.g. predetermined), and the regions representing the items are drawn along the path. For example, the device may arrange regions 42,43,44,46,47 along the path so as to be maximally spaced apart (e.g. so that the centres of the regions are maximally spaced apart).

Since the selection is from five items, the sensitive area 3 includes five notional sections 48, 49, 50, 51, 52, which respectively correspond to the five areas 42, 43, 44, 46, 47 along the path. For example, by contacting the section 51 the user may select the item represented by region 46. Thus, the correspondence between the arrangement of the sections 48, 49, 50, 51, 52 is defined by a relationship between the path 40 and the row in area 3. Their topological is not removed by the fact that the path 40 flexes.

Although, as in the preceding embodiments, it is preferable that the topology of the regions (e.g. the topology of a path along which they are laid out) corresponds to the topology of the sections of the area 3, this is not in fact a necessary requirement for the arrangement of the regions to correspond to that of the sections.

For example, FIG. 5(*a*) shows an embodiment in which the path 40 is a loop. Again the regions 53,54,55,56,57 are arranged with their centres along the path, so as to be maximally mutually distant. A loop 40 has a different topology to the row of the regions in area 3, and thus there are several ways in which the correspondence of the regions and sections can be defined.

For example, the correspondence can be defined based on a projection of the arrangement of the regions onto the horizontal direction. Thus, the correspondence would be between regions 57,56,53,55,54 and sections 48,49,50,51,52 respectively.

However, a more preferable correspondence is defined based on the loop path 40, by defining a starting point of the path and a rotating direction, so that the path becomes topologically equivalent to a row. For example, the starting point of the path (e.g. the region out of the regions 53,54,55,56,57 which corresponds to the section 48) may be the uppermost region 53. That region may then be highlighted to indicate that it is the start of the path. It may also be predetermined that the left-to-right direction on FIG. 5(*a*) corresponds to, for example, a clockwise direction along the loop path 40.

Many variations of the scheme of FIG. 5(*a*) would immediately present themselves to a skilled person.

It is not necessary that the sections of the sensitive area are in a row. Indeed, in the case that the sensitive area is sensitive to the position of contact in two directions, rather than one, it may be more efficient if the sections are in a two dimensional arrangement, rather than having their centres substantially along a row. FIG. 5(*b*) shows sensitive area 3 which can replace the sensitive area 3 of FIG. 5(*a*). In this case, the sensitive area has five sections 48, 49, 50, 51, 52 substantially covering the whole two-dimensional range of the area, each being a segment of the area subtending 72 degrees.

Similarly, embodiments such as FIG. 5(*a*) in which the regions are arranged around a loop-path are very suitable if the data input means is a joystick or other indicator device, having a member which can be pushed or urged radially from central position. The continuous range in this case may be the direction (angle) of the radial displacement (for example, a 360 degree range). The sections in FIG. 5(*b*) in this case thus correspond to angular ranges of displacement of the stick (or other member), e.g. together substantially occupying all 360 degrees, respectively arranged in positions corresponding to the positions of the regions 53,54,55,56,57.

Figure 6:
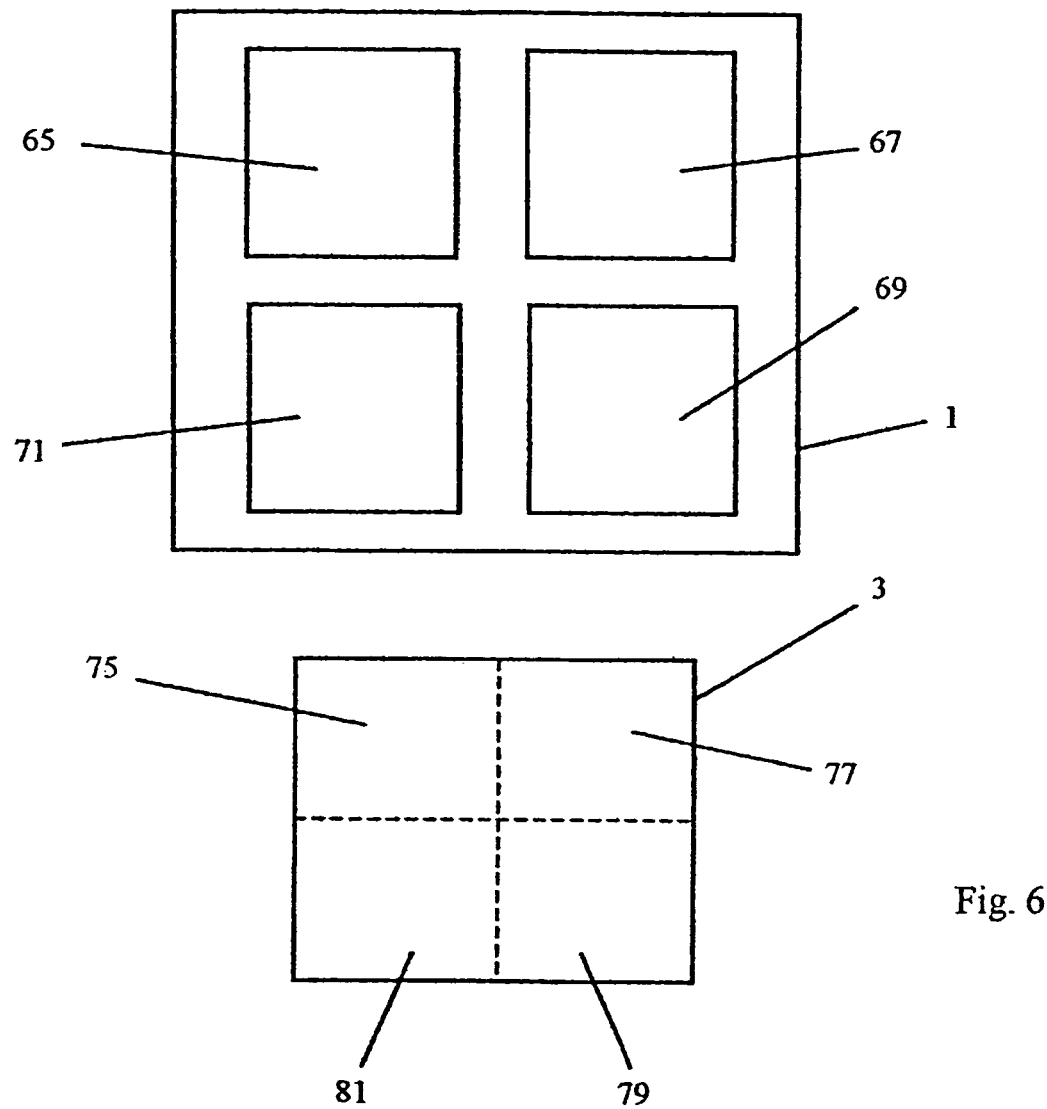
FIG. 6 shows a method according to the invention for selecting from four items.

In FIG. 6 there are four items to choose from, and the device accordingly presents four regions 65,67,69,71 to the user. The processor partitions the sensitive area into four areas 75,77,79,81 in an arrangement corresponding to the four regions 65,67,69,71.

Figure 7:
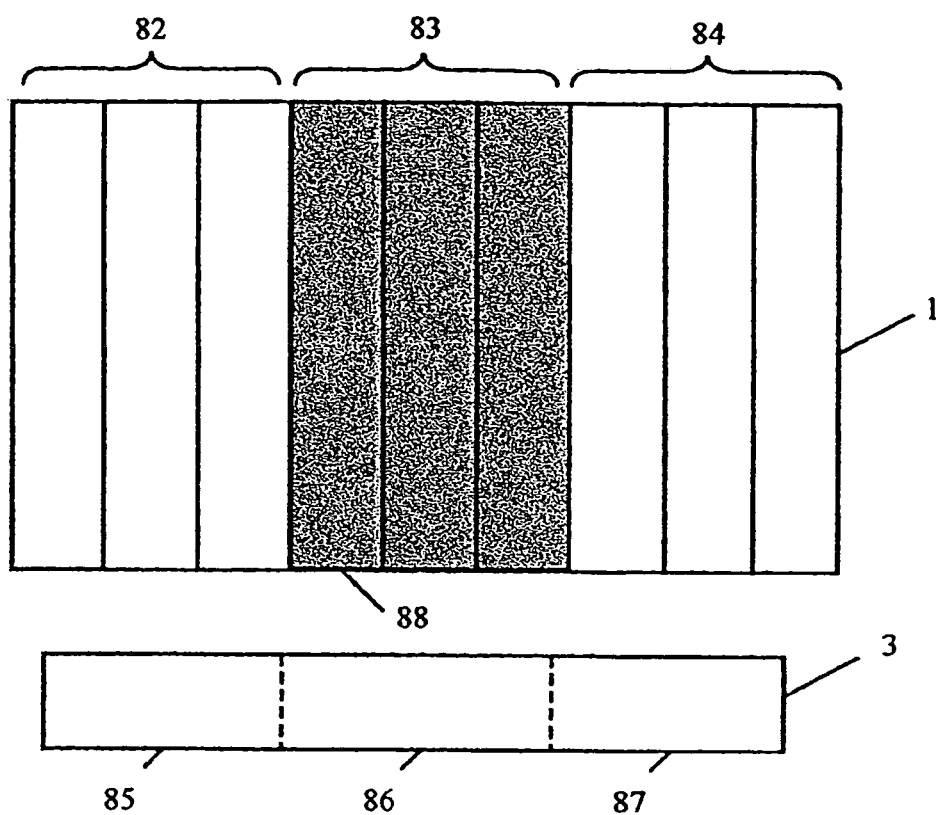
FIG. 7 shows selecting one of 9 items by three steps of gradually increasing detail.

In the schemes of the earlier embodiments, the sections of the sensitive area become small if the number of items is high. FIG. 7 shows a method of overcoming lack of resolution caused by this effect. For a number of items greater than a certain value (which may be fixed or user selected), the method defines three subsets of regions 82,83,84, each containing three regions. For each of these subsets of regions, a section of the sensitive area 3 is defined. For example, as shown in FIG. 7, the user's finger is making a light (or long duration) contact with the centre section 86, which causes the central subset 83 to be highlighted. Tapping on this central section selects the subset 83.

The resolution level now changes, so that a selection can be made from the three regions in the subset 83. Since the subset contains three regions, there are still three sections 85,86,87 in the sensitive region 3, but they respectively correspond to regions in the subset 83. Thus, by making a light (or long duration) contact with the left section 85 of the area 3, the user can cause the region 88 only to be highlighted, and he may definitively select this item (e.g. so that the file is opened) by tapping on the section 85.

In other arrangements, dragging may be used to supplement light contacts.

Incidentally, if there were more than nine items from which the user had to make the selection, they could be represented by regions in the display area yet narrower than those in FIG. 7. In principle, this could be performed up to any number of items (according to the resolution of the display). Alternatively, it would be possible to define a number P of a maximum number of items for which all items are given a respective region. If there are more than P items, for example, P regions may be displayed respectively corresponding to P of the items. Regions for the other items could be brought into view by scrolling the display 1 in one direction (left or right), for example by a certain sort of contact at one end of the sensitive area 3. That is, one may think of there being a number of regions equal to the number of items and those regions are in a row, and the display is displaying a variable subset of P consecutive ones of the regions at any time. In this case, the number of regions displayed on the screen at any one time is not equal to the number of items, but less than the number of items.

Figure 8:
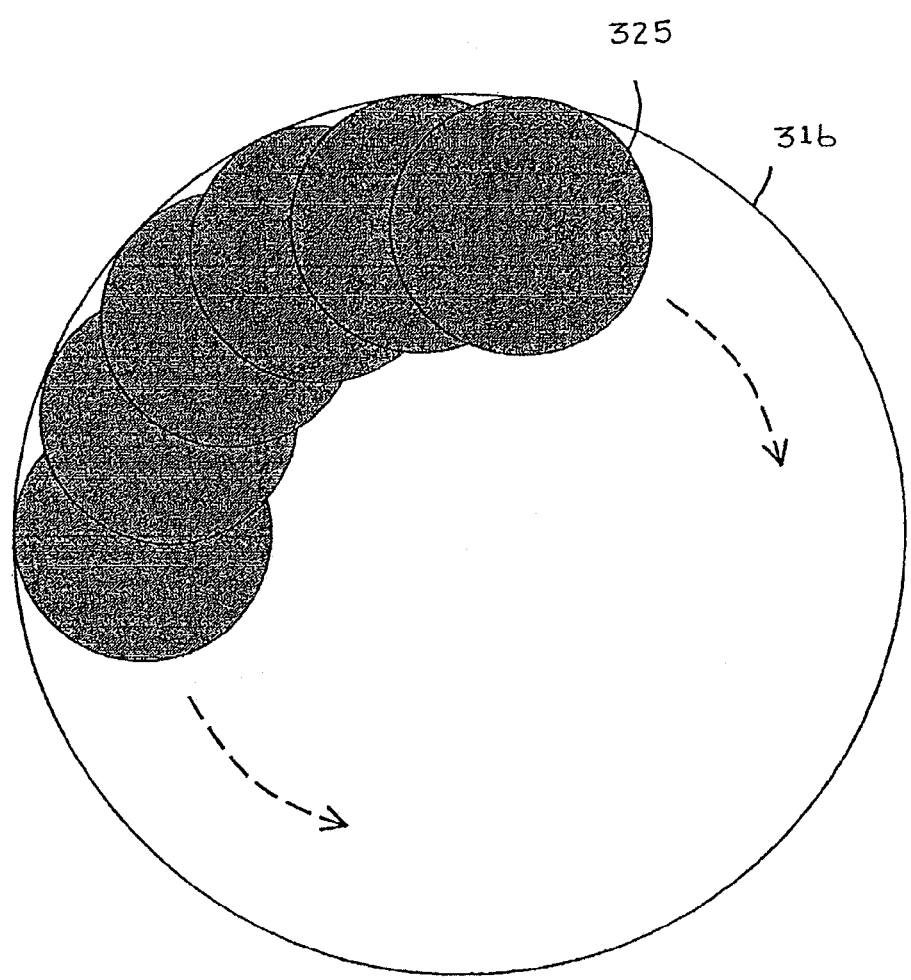
FIG. 8 shows schematically a way of laying out regions according to another embodiment of the invention.
Figure 9:
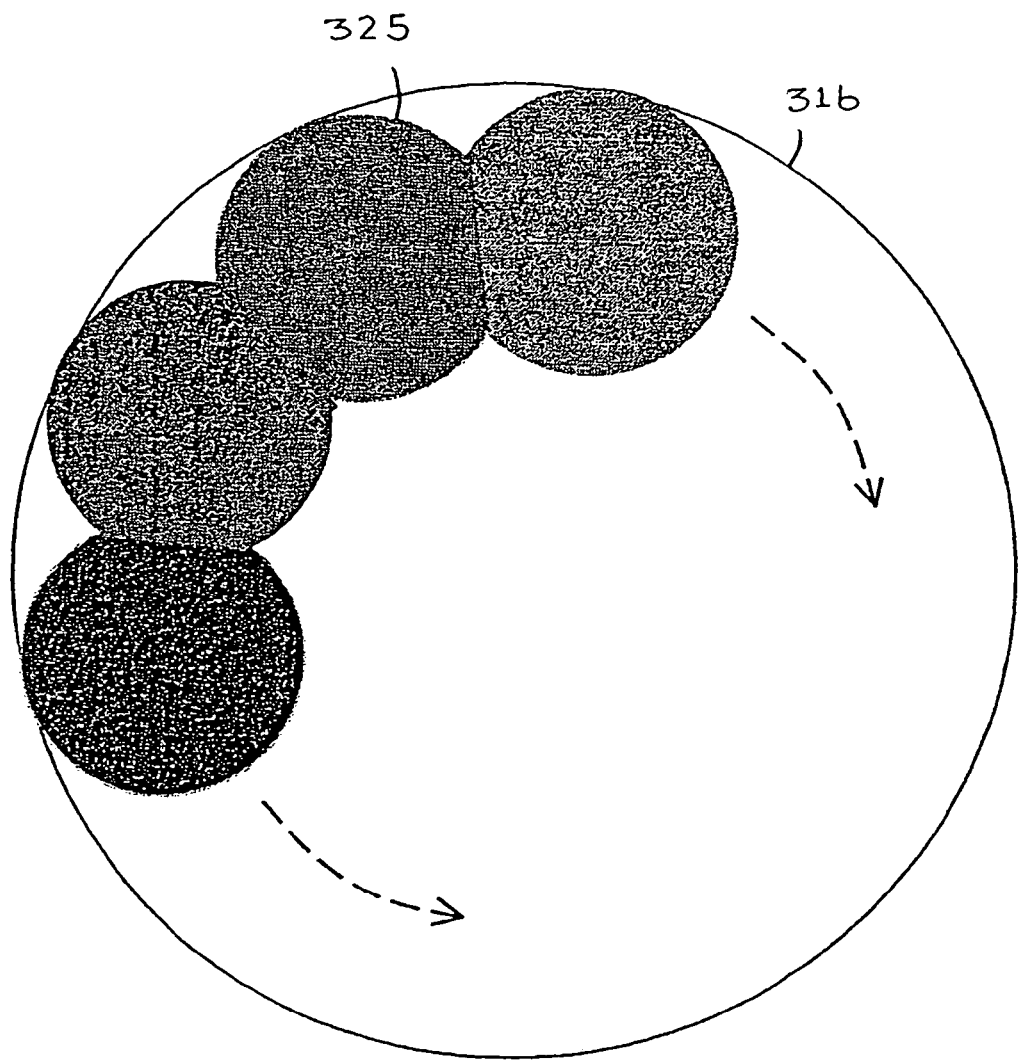
FIG. 9 shows schematically a way of laying out regions according to another embodiment of the invention.

FIGS. 8 and 9 respectively each show an arrangement of regions 325 along a circular path 316. In FIG. 8 an 325 data file is represented by a circular region 325 by overlapping circular regions 325. To reduce the chance of confusion, the user may be able to indicate one of them, highlighting it and putting the other regions 325 with which it overlaps into a background (e.g. "behind" the highlighted region) mode.

An alternative to overlapping regions 325, is for regions 325 to be squeezed (e.g. from circles into ellipses or as shown in FIG. 9). The degree of squeezing may be chosen so that a desired number of circles may be drawn inside the inner circumference of the region 316 without their radial extension becoming overly small. FIG. 9 illustrates also the use of an incrementally varying grey scale to distinguish the regions in the display. The shading may be between two colours, and the regions to be coloured may be split into two or more segments each of which uses the full range (or its own particular range) of colours. For instance children to the right of the parent may be shaded from white to black as the user moves clockwise, and those children to the left may be shaded from black to white. This allows the regions to be shaded in a continuous or incremental manner, thus avoiding a major discontinuous change of colour, and thus an undue emphasis being given to files adjacent the discontinuity which is not merited by any significance of those files.

Various schemes in which the method or device supplies (on a user's instruction) additional information to about the significance of files will be discussed below with reference to FIG. 13. All are applicable to all the embodiments above.

We now move on to a discussion of the present invention in combination with a fractal space map.

A particularly readily comprehensible manner of navigating through the logically related data files is for the user to do so level by level (that is for successively increasing values of i). Since the (i+1)-th regions of each i-th region are preferably laid out along a one-dimensional path, the user may at each level select a file using a one-dimensional movement. Having thus selected an (i+1)-th region, the user may then indicate (e.g. by depressing a key) that he wishes to navigate within the (i+2)-th regions related to that (i+1)-th region. Thus, selection of any file in the plurality of data files may be accomplished purely by a one-dimensional indication, coupled with an indication of changing level to successively increasing i.

This can make navigation very much easier since it is physiologically natural for a human operator to make a one-dimensional motion, as compared to a two-dimensional motion. The one-dimensional motion in some situations may be for example be moving a mouse in the user's hand in a one-dimensional sweep (e.g. a hand movement with the user's elbow static), or a motion of an indicating device which is intrinsically one-dimensional, such as a knob or slider.

To facilitate further this motion, a section of the display area may indicate by symbols in a substantially straight one-dimensional line, the set of files between which the user is choosing by the one-dimensional motion. For example, a row of shapes (squares) may be provided (possibly scaled so as always to fit the same onscreen area however many files need to be thus displayed) corresponding in number to the number of (i+1)-th files from which the user makes his selection. The inventor has found that it is easiest if this on-screen area is horizontal on the display area as viewed by a user in some contexts for the physiological reasons given above: in this case the user is far less likely to be disorientated by any curvature in the path in the mapping of the invention along which the (i+1)-th regions are laid out.

Figure 10A:
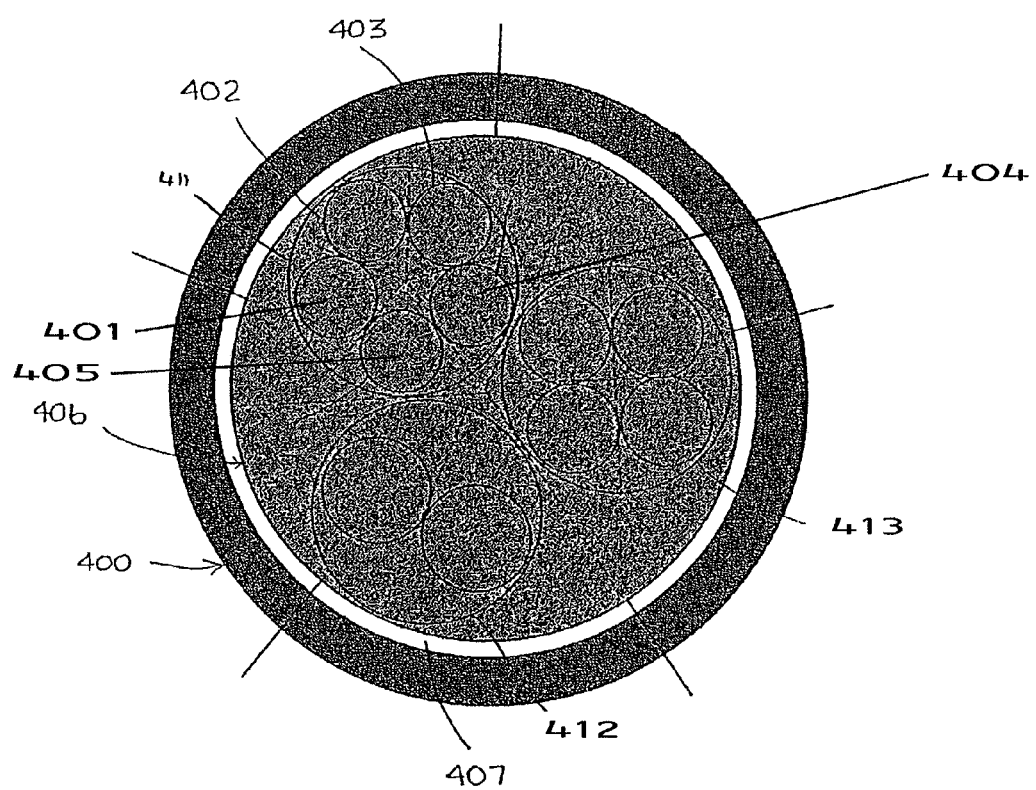
FIG. 10 shows a further device according to the invention.

A further example of a device according to the invention is shown on FIG. 10(a). The input means (indicator device) in this example is a circular indicator device 400 representing the loop-shaped range which is capable of registering a user pressing at any point on its circumference. The interior of the indicator device 400 includes a screen 406, which is presently displaying a fractal map. The entire display area here represents a first file. The user has already indicated a second region 407 on the fractal map, which includes 5 third regions 401, 402, 403, 404, 405 for this second region 407. The loop shaped range is automatically divided into five sections, "zones" (these five zones are preferably indicated visually to the user, e.g. by different respective displayed colours within the ring 407), so that the user can select one of the third regions 401, 402, 403, 404, 405 by selecting one of the five sensitive zones. The five sections together substantially occupy the whole of the circumference of the range. Although in FIG. 10(a) for simplicity no regions beyond 3 clicks from the first file are shown n=3), in other embodiments files many clicks from the first file will be included to give a complex fractal picture including a total of up to several thousand regions.

It is envisaged that the device shown in FIG. 10(a) may be in the form of a watch, with the indicator device 400 for example being in the position of the bezel of the watch. Indeed, the sensitive area may be arranged to be rotatable in its plane about its centre. In this case, a "light" sliding contact (discussed above in the context of the touch sensitive area 3), might here correspond to rotating the bezel while not touching it; while a heavy contact might correspond to touching the bezel; a drag" might correspond to touching and rotating together.

Alternatively, or additionally, the device 400 may be cantable, so that the user can cause it to cant out of the rest plane by touching it at one side; by the user continuing this contact while moving his finger around the periphery of the device, the direction of canting can be varied continuously.

In either case, the indicator region 400 preferably does not display information. However, a region 407 of the display 407 adjacent the loop shaped range corresponding to the indicator device 400 may indicate the positions of the sections, e.g. by colours or other display in segments aligned with the sections of a bezel constituting device 400. In alternative embodiments, the indicator device 400 may be arranged with the capacity to display information to indicate the locations of the sections.

When the fractal map is not being displayed, the device may display the time on the screen 406 (possibly by means of another fractal map).

Although not illustrated in FIG. 10(a), the device shown may further include a labeling scheme indicating the significance of the five regions 401, 402, 403, 404, 405 (e.g. one written in the ring 407, in circumferential positions corresponding to the sensitive regions of the bezel).

There are various ways in which the device may be engineered to allow the user to input information. The user may be also be able to adjust his selection by for instance pressing (or just touching) a point of the circumference, thus causing a particular position to be highlighted. They may have the option of turning (by rotating or, as explained below, by canting) the bezel while still pressing causing the highlight to move to a neighbouring (or other) region, and then release the bezel to select the new highlight as that region.

To perform a sliding click, the user may for example be able to hold down a point of the bezel and rotate the point of contact around the circumference.

An advantageous way in which this can be engineered is for the bezel to be capable of canting, with respect to the plane of the display 406 in any direction, so that contacting the bezel causes it to cant in the direction of the contact (i.e. about a line in the plane of the display which is perpendicular to the line from the centre of the display to the point of contact). The user may then slide his finger around the bezel, so that the direction in which the bezel cants follows the user's finger.

Figure 10B:
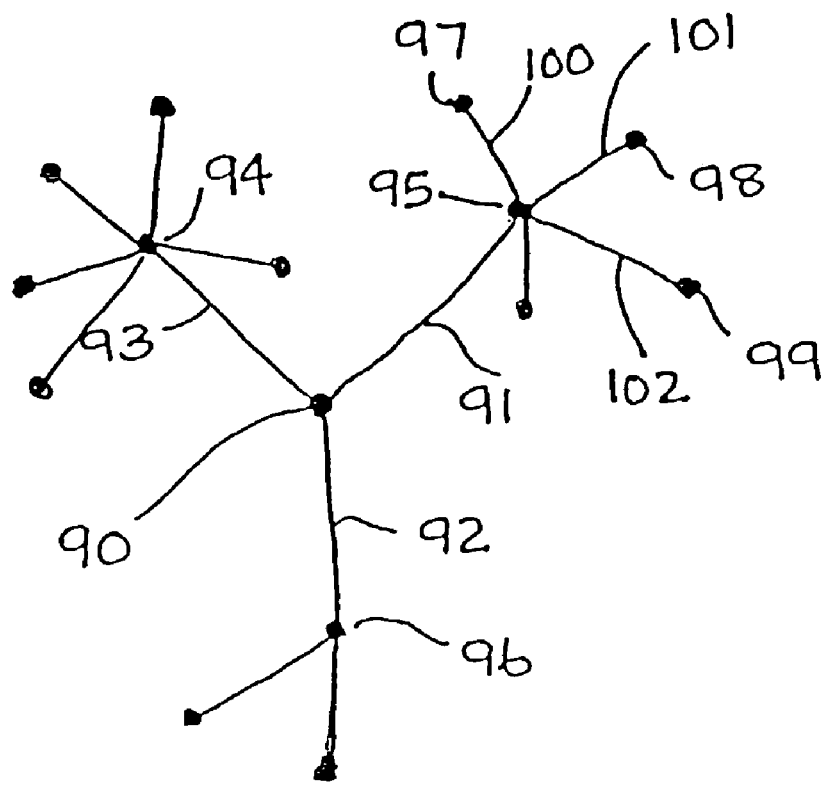

For all embodiments of the invention, although as shown above the regions are all relatively large portions of the display area, they may alternatively be of any size. For example, they may be point-like, and the logical connections between the regions may be indicated by lines. This is illustrated by FIG. 10(b), which shows a display which is logically equivalent to that in the region 406 of FIG. 10(a). Thus, the area-based display used in the device of FIG. 10(a) may replaced by the display of FIG. 10(b). Note that this does not change the way in which the sections are defined, or the way in which the data input means is used.

Figure 11A:
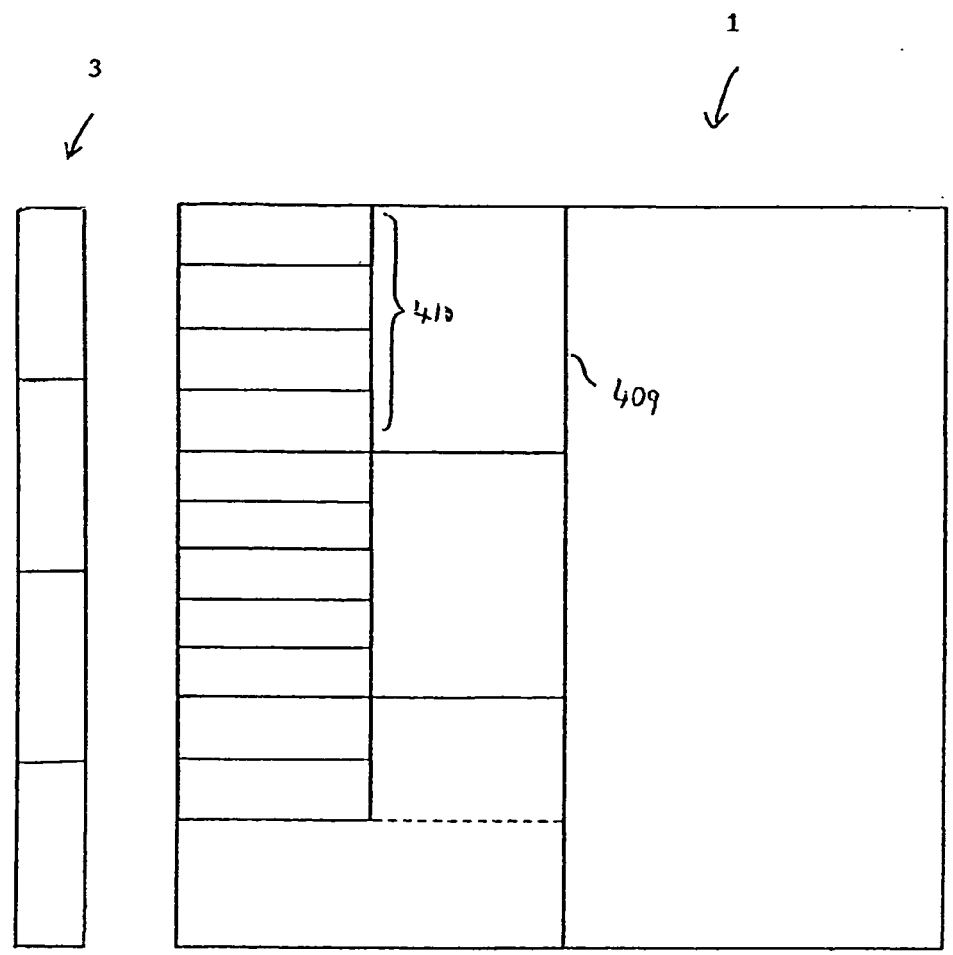
FIG. 11 shows another way of laying out regions according to an embodiment of the invention.

FIG. 11(a) is another map according to the invention, in which the (i+1)-th regions of each i-th region have a width (as viewed in the orientation of the figure, which need not be the same as the actual display) equal to half the width of the i-th region, and a height which is equal to the height of the i-th region divided by the number of (i+1)-th regions. One of the three second files is a frame set, as indicated by the dashed line. The user has already, by a selection according to the invention selected a file corresponding to a second region 409, a now using the sensitive area 3 he is selecting one of the third regions which are children of the second region 409.

Figure 11B:
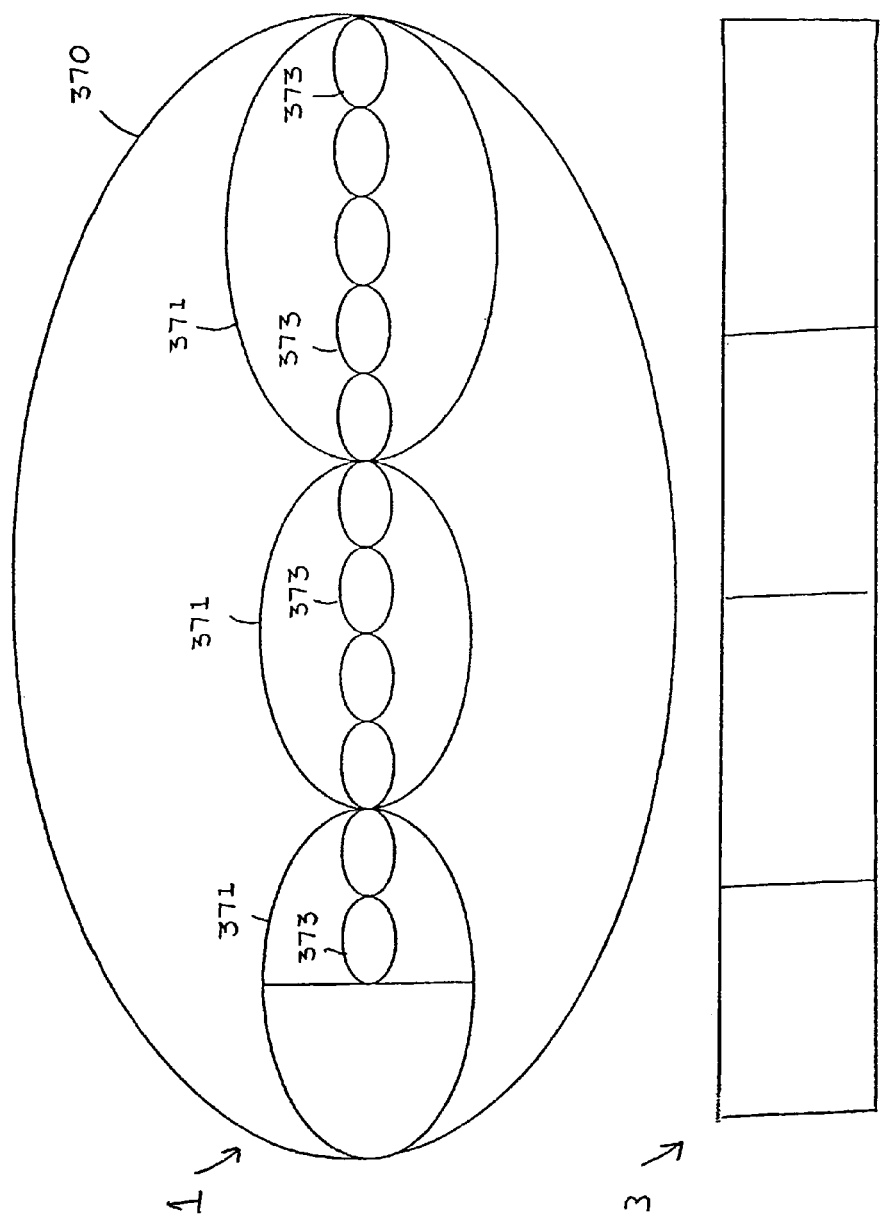

FIG. 11(*b*) shows another map drawn according to the invention, showing a situation equivalent to that drawn in FIG. 11(*a*). This time, the rule is that all files are ellipses, having their long axis on a horizontal (as viewed in the figure) line through the middle of the screen. A frame set is represented by a vertical line dividing the ellipse in two. All third regions have an equal length in their long axis, and within all of the above constraints, each ellipse is maximally long. This gives a result that the size of each of the second regions (and possibly also the size of the respective sections in the data input means) depends on the number of third regions which they respectively contain.

Figure 12A:
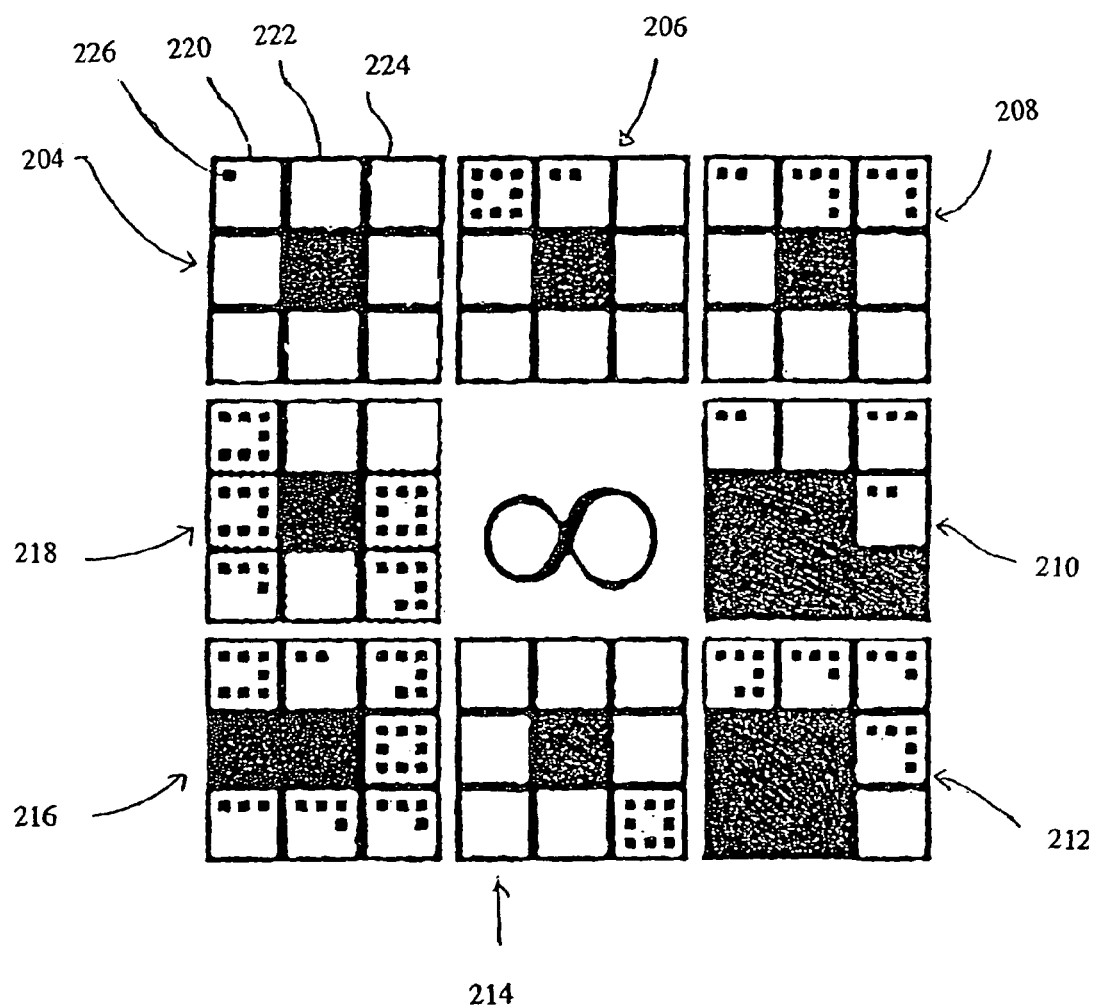
FIG. 12 shows another way of laying out regions in an embodiment of the invention.
Figure 12C:
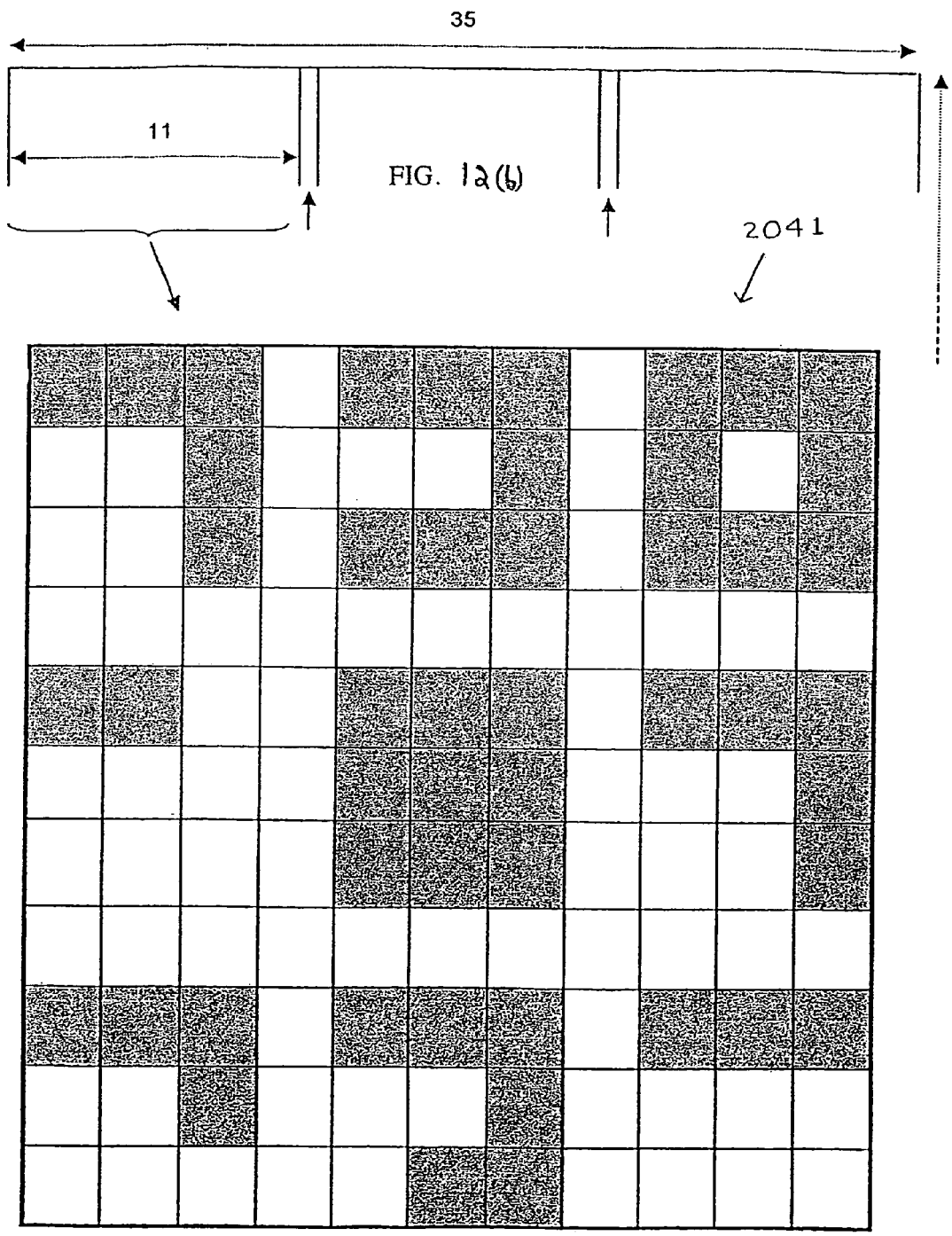

FIG. 12(*a*) shows a further fractal space map, which can be used with the present invention and which is able to display information about a large number of files even if the resolution of the display is severely limited.

As will be seen, it has several distance scales, the largest of which is essentially the width of FIG. 12(*a*). Another distance scale ("the first distance scale") is slightly less than one third of this, and is the distance scale on which eight 2-nd regions 204, 206, 208, 210, 212, 214, 216 and 218 are drawn (that is this distance scale is the horizontal width of the regions). The area enclosed by the eight 2-nd regions is left for displaying an icon representing a meaning.

A yet smaller "second distance scale" is a distance scale on which 3-rd regions 220, 222, 224 (for example) are drawn, and is approximately one third of the first distance scale. A "third distance scale", which is approximately one third of the second distance scale, is a distance scale on which 4-th regions 226 etc, are drawn.

First, referring to FIG. 12(*a*), a user can see at a glance that there are at least eight 2-nd data files, represented by the areas 204, 206, 208, 210, 212, 214, 216, 218, and that there are at least eight 3-rd data files 220, 222, 224 logically related to the 2-nd data file represented by region 204. There is one data file (represented by region 226) which is logically related to the 3-rd data file represented by 3-rd region 220.

Also, for instance, there are only 4 3-rd data files logically related to the 2-nd data file represented by region 210.

As explained above, the map according to the invention shown in FIG. 12(*a*) can display a maximum of 8 (i+1)-th directories related to each i-th directory (the central region of each square may be reserved for an icon). The question therefore arises of what, if anything, the method of the invention should do in the case that there are more (i+1)-th files than a predetermined upper limit, M. There are two possibilities. Firstly, in or near the i-th region, a symbol may be drawn (for example in the central part of the square 204 of FIG. 12(*a*)) indicating that there are (i+1)-th files which have not been represented. Such a symbol could, for example, be displayed in the central part of square 204. Alternatively, the region representing a given i-th data file could be expanded (e.g. to encompass the two squares 204 and 206) to give sufficient space for the display of all of the (i+1)-th files. For example, in the case that the i-th region is a combination of squares 204 and 206, the display could represent up to 16 data files logically related to the i-th data file.

The value of M may be chosen according to physiological or psychological data. For example, it is generally accepted that in many situations humans dislike having to choose between a large number of alternatives, so the value of M is preferably not more than 5, 6, 10 or 20 in all aspects.

In the context of the present invention, to perform a selection from a set of siblings, a number of sections equal to the number of siblings may be defined (e.g. the continuous range may be partitioned into this number of sections), whereby the user can select a sibling by selecting a region.

This is particularly suitable if the data input means is a joystick having a central position which may correspond to the area in the centre of the ring of up to eight siblings. Another especially suitable input means is that shown in FIG. 5(*b*), with a number of sections equal to the number of siblings.

FIGS. 12(*b*) and 12(*c*) show how a display showing all the information present in FIG. 12(*a*) can be produced on such a screen. A region 2041 (corresponding in meaning to the region 204 in FIG. 10) can be drawn as shown in FIG. 12(*c*) on just a 11×11 grid (note this arrangement leaves one pixel between the blocks corresponding to regions 220 and 222 on FIG. 12(*a*), and between the blocks corresponding to regions 222 and 224). To present a map which is equivalent to the whole of FIG. 12(*a*), three of the 11×11 grids shown in FIG. 12(*c*) are arranged with a one pixel space between them, FIG. 12(*b*) giving a total width of 35 pixels. In other words, a diagram containing all the information of FIG. 12(*a*) can be presented in a mere 35×35 array of pixels.

In practice, the present inventor has found that an array of this size tends to be hard to read unless the pixels have more than two states (e.g. not just black and white, but one or more further colours). It has been found to be acceptable in the case that each pixel has three states.

To improve clarity (and especially in the case that the pixels are limited to two states, e.g. black and white), an additional pixel may be left between blocks corresponding to regions 204 and 206, and between blocks corresponding to regions 206 and 208 (and the vertical spacing of the second regions is increased correspondingly); the grid then becomes 37×37. Preferably, the number of pixels along each side of the map is less than 150, more preferably less than 100. An especially preferred case is that the number of pixels used to form the display is 77×77 (as in FIG. 12(*a*)).

Additional rows of pixels can be left either between blocks of the display or around their other edges for gradually increasing clarity according to the capacity of the display device (taking into account other information which the display device is required to display at the same time as the map of the invention). Note that at any level of depth q (up to eight) data files are laid out in the first q positions in a sequence of M=8 positions, corresponding to the positions of the numeral keys 1-4 and 6-9. In this case the sequence is in a clockwise closed path of eight positions. The path is in relation to a predefined direction in the map (for example the first 3 positions are in the horizontal direction on the screen).

We now discuss methods of allowing the user to gain a greater insight into the meaning of small regions. Although these are explained here in diagrams showing a fractal space map, all are applicable in the case that the display is not showing a fractal space map.

In FIG. 13(*a*), the significance of the data files is indicated by "icons" (represented in the figure by the upper and lower case letters, although of course other symbols may be used). The icons for the (i+1)-th files displayed inside an i-th file might only become visible (and possibly also the icon representing that i-th file might disappear entirely as shown) when the user highlights that i-th file in some way, for instance by means of a mouse. This is referred to here as an "icon trail", and can help the user concentrate on the relevant portion of the map.

Figure 13A:
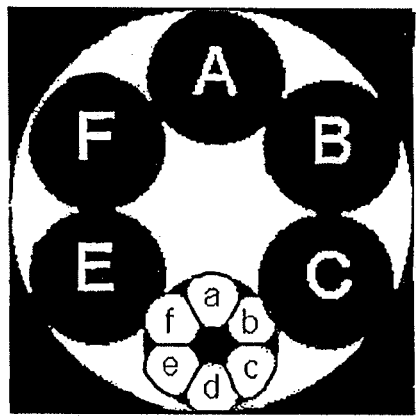
FIGS. 13(*a*)-(*c*) shows three ways of displaying information characterising data files.

An example of the use of FIG. 13(a) in combination with a sensitive area (e.g. of FIG. 5(b)), would be by the user first selecting one of the circles A to F by sliding his finger on the sensitive area covered by six segments, causing the respective circle A to F to be highlighted, and then, when this occurs removing his finger (or tapping on that location). This sliding click selects region D (the one containing the smaller regions a to f).

As there are six files related to area D, the segments of the sensitive area are unchanged. The user again slides his finger on the area, highlighting successive one of the circles a to f, until he has found the section of the area corresponding to an item in which he is interested. Lifting or tapping his finger in that section selects this item.

Figure 13B:
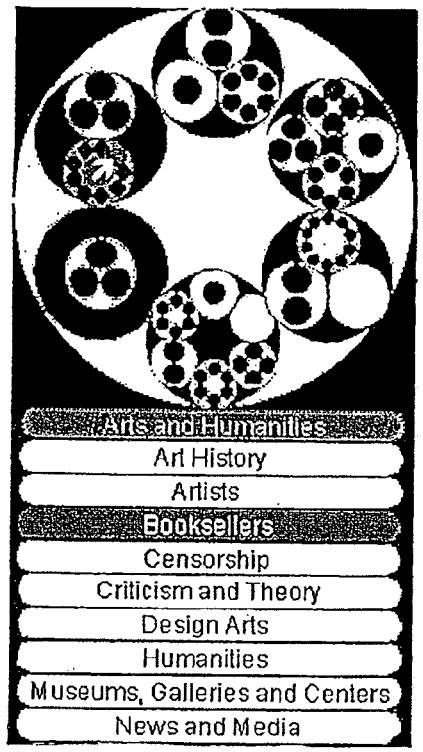

In FIG. 13(b), the meaning of the data files is indicated by a separate display panel or area. For the file a user is interested in (a 4-th file, indicated by an arrow), the display contains a heading of the title ("arts and humanities") of the 3-rd file to which the 4-th file is logically related, and all the nine 4-th files related to this 3-rd file. Of these, the title of the 4-th file in which the user is interested ("booksellers") is highlighted. If a user performs a sliding click in the configuration shown in FIG. 13(b), as well as (or instead of) the 4-file corresponding to the section he is selecting at any instant being highlighted, the respective one of the nine headings may be highlighted. The user can then make his definitive selection by completing the sliding click.

The highlight may alternatively or additionally be indicated by drawing a line from the region of the map that is currently highlighted to the corresponding part of the display panel (e.g. if the display panel is drawn to either side of the map instead of below as shown), and/or the map and display panel may be colour coded in order to relate in addition for instance all the 4-th regions to their titles.

Figure 13C:
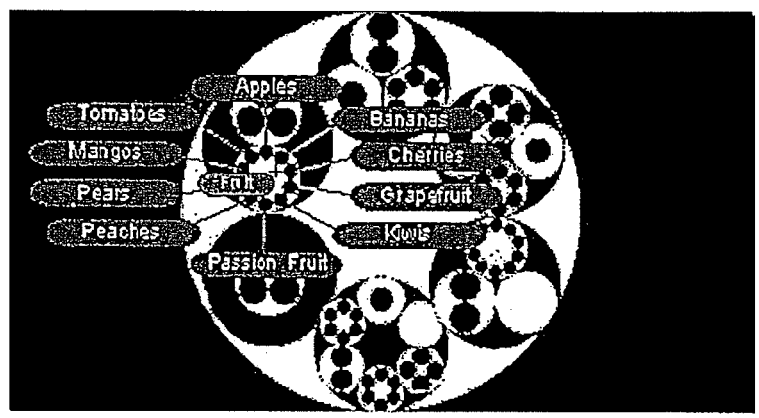

FIG. 13(c) shows an alternative technique in which information (e.g. the titles as shown) concerning the relevant data files is generated within separate (possibly transparent) areas that are arranged accordingly and connected by lines to their corresponding regions and that are drawn over the main map. The arrangement of the areas may be determined to ensure that the areas do not overflow outside the display. They may be displayed on a command by the user, e.g. a selection of the item containing the 10 children.

Any of these techniques may allow a user to derive information about the meaning of a file without actually opening it, thus enormously speeding up for example movement to an appropriate file. In addition all three techniques can be used in conjunction with the sliding click technique described above. Thus, each method is useful in a sliding click technique.

We can draw a distinction between three methods of accessing files. A first method, "serial access", may moving through a list of files one-by-one with an action (for instance a press of a button or moving a roller indicator on by one notch) for each motion. A second method "parallel access", is a series of one-dimensional motions (as in the last paragraph). A third method, "fractal access", is by a two (or more) dimensional selection, to leap to a file several logical links away.

The world wide web contains many pages which are secure, in the sense that certain users are not permitted to access (e.g. secure pages for which a password or other identification is required). Even a directory structure inside a firm may contain such pages. In the case that the links inside a page are not public, the embodiment may draw a map based upon whatever information is available to it, for example a region indicating the existence of a page without any structure inside that region. The way the region is drawn may indicate that a page is secure. A user may be able to supply password or identification information to the embodiment, so that in the case of files which the user is in fact entitled to the see (even if the general public are not) the embodiment can interrogate the web site, server, etc to gain information about the secure page, and thus supplement the map. The embodiment may alternatively or additionally include a pre-written file of password or identification information, so that without intervention by the user it can obtain information about any data file which the user is entitled to look at.

The files to which the present invention is applicable may be classified in several ways. A first classification is "local vs. network", where local files are files within a single device (or a set of spatially close devices), and network files are stored in more distant locations, e.g. networked by telecommunications. Another possible classification is "content vs. functional", where "content" files are files of which the content itself is displayed to a user, and "functional files" are files which contain programs for performing a function. Thus, a help file in a user's PC is a local content file (a user reads the text in the help file to understand a function of the PC); a web-site showing prices of an article is a network content file (a user accesses the server of the file to read the content); Microsoft Word in a PC for controlling a printer is a local functional file; an application managed from and accessed via a web site or program server is a network functional file. Another example of a network content file may be a file concerning say current open connections generated by a piece of hardware which operates in a network, e.g. a switching circuit The embodiments above have been presented for the sake of example only. As will be clear to a skilled person, many variations of the mapping methods explained above are possible.

The invention claimed is:

1. A method for allowing a user to select one of a variable number of items, the method employing a device having a display area and, separately from the display area, a data input means which registers a selection made by the user within a loop-shaped range,
   the method including:
   displaying within the display area a variable number of regions equal to the variable number of items;
   defining within the range a variable number of sections equal to the variable number of items, the arrangement of said sections corresponding to the arrangement of said regions of the display area, each section corresponding to a respective region,
   whereby the user can select one of said items by selecting a respective one of said sections.

2. A method for allowing a user to select one of a variable number of items, the method employing a device having a display area and, separately from the display area, a data input means which registers a selection made by the user within a loop-shaped range,
   the method including at least once performing the steps of:
   (a) displaying within the display area a variable number of regions, each region corresponding to one of the variable number of items,
   (b) defining a variable number of subsets of said regions;
   (c) defining within the range a variable number of sections equal to the variable number of subsets, the arrangement of said sections corresponding to the arrangement of the respective subsets of regions, whereby the user can select one of said subsets by selecting the respective one of said sections;
   (d) at least once defining a variable number of subsets of said selected subset of regions; and defining within the range a variable number of sections equal to the variable number of subsets, the arrangement of said sections corresponding to the arrangement of the respective subsets of regions, whereby the user can select one of said subsets by selecting the respective one of said sections; and (e) defining within the range a variable number of sections equal to the variable number of items in the said selected one of the respective subsets of regions, the arrangement of said sections corresponding to the arrangement of the respective regions representing the items, whereby the user can select one of said items by selecting the respective one of said sections.

3. A method according to claim 1 or claim 2, in which the regions are provided along a path corresponding to the circumferential direction of the range, the path within the display area is independent of the number of regions, and the step of displaying the regions includes partitioning the path into a number of elements corresponding to the number of regions and displaying a region in each path element.

4. A method according to claim 1 or claim 2, in which for each possible number of regions up to a maximum, there is a predefined arrangement of that number of regions.

5. A method according to claim 1 or claim 2, in which the regions have respective centres which are not on a straight line.

6. A method according to claim 1 or claim 2, in which the range is a range of circumferential locations within a loop-shaped contact sensitive area.

7. A method according to claim 6, in which the contact sensitive area encircles the display area.

8. A method according to claim 6, in which the data input means has a rest plane, is cantable out of the rest plane, and is sensitive to the direction in which it is canted, said range being a range of directions in which the data input means can be canted, the user making said selection by contacting the device to cant the data input means in a selected direction.

9. A method according to claim 1 or claim 2, in which the sections collectively cover the whole of the contact sensitive area, so that defining the sections is equivalent to partitioning the entire area.

10. A method according to claim 1 or claim 2, in which the user can (i) vary the selection of the item, information being displayed in relation to the item corresponding to the present selection, and (ii) by a predetermined action make a definitive selection.

11. A method according to claim 10, in which the variation of the selection is made by rotating the data input means.

12. A method according to claim 1 or claim 2, which is performed repeatedly, on each occasion selecting form items which are logically related to the item selected in the previous step.

13. A method according to claim 1 or claim 2, in which the logical relationships are of any type or types suitable for defining a hyperspace.

14. A method according to claim 1 or claim 2, in which the items are data files, sets of data files or portions of data files.

15. A method according to claim 14, in which at least one of the data files are stored in a location remote from the device but accessible to the device.

16. A method according to claim 14 in which, upon selecting a data file, the user is presented with at least one information about that data file.

17. A method according to claim 14 in which, upon selecting a data file, the user can open the selected data file.

18. A device for allowing a user to select one of a variable number of items, the device having:

a display area, for displaying a variable number of regions equal to the number of items;

data input means, separate from said display area, which registers a selection made by the user within a loop-shaped range; and a processor for (i) defining within the range a variable number of sections equal to the variable number of items, the arrangement of said sections corresponding to the arrangement of said regions of the display area, and each section corresponding to a respective region, and (ii) upon a user selecting a respective one of the sections, determining the corresponding item.

19. A device for allowing a user to select one of a variable number of items, the device having:

a display area for displaying a variable number of regions, each region corresponding to one of the number of items;

a data input means which registers a selection made by the user within a loop-shaped range; and a processor for (a) defining a variable number of subsets of said variable number of regions;

(b) dividing the loop-shaped range into a variable number of sections equal to the variable number of subsets, the arrangement of said sections in the loop-shaped range corresponding to the arrangement of the respective variable number of subsets of regions, whereby the user can select one of said variable number of subsets by selecting the respective one of said sections;

(c) at least once defining a variable number of subsets of said selected subset of regions; and dividing the loop-shaped range into a variable number of selectable sections equal to the variable number of subsets, the arrangement of said selectable sections corresponding to the arrangement of the respective variable number of subsets of regions, whereby the user can select one of said variable number of subsets by selecting the respective one of said variable number of sections; and (d) dividing the loop-shaped range into a number of selectable sections equal to the variable number of items in the previously selected subset, the arrangement of said selectable sections corresponding to the arrangement of the respective regions representing the items, whereby the user can select one of said items by selecting the respective one of said sections.

20. A device according to claim 18 or claim 19, in which the data input means is not adapted to display information.

21. A device according to claim 18 or claim 19, in which the range is a range of circumferential locations within a loop-shaped contact-sensitive area.

22. A device according to claim 21, in which the contact sensitive area encircles the display.

23. A device according to claim 21, in which the data input means has a rest plane, is cantable out of the rest plane, and is sensitive to the direction in which it is canted, said range being a range of directions in which the data input means can be canted, whereby the user can make the selection within the range by contacting the data input means to cant the data input means in the corresponding direction.

24. A device according to claim 18 or claim 19, which is an item of consumer electronics.

25. A device according to claim 18 or claim 19, in which the display area is a low resolution screen.

26. A device according to claim 18 or claim 19, which is a one-piece unit.

27. A device according to claim 18 or claim 19, which is portable.

28. A computer-readable medium having stored thereon a computer program which causes a computer device to perform the method according to claim 1 or claim 2.

* * * * *